United States Patent

Schnegg et al.

[11] Patent Number: 5,600,974
[45] Date of Patent: Feb. 11, 1997

[54] STIFF FABRIC COMPOSITE AND METHOD OF MAKING

[75] Inventors: Julius R. Schnegg, Burlington; Manfred H. K. Hueneke, Graham; Bobby L. McConnell, Greensboro, all of N.C.; John Rinderman, deceased, late of Norwood, N.J., by Mrs. John Rinderman, legal representative

[73] Assignee: Burlington Industries, Inc., Greensboro, N.C.

[21] Appl. No.: 331,927

[22] Filed: Oct. 31, 1994

Related U.S. Application Data

[60] Division of Ser. No. 111,521, Aug. 25, 1993, Pat. No. 5,436,064, which is a continuation-in-part of Ser. No. 900,460, Jun. 18, 1992, abandoned, Ser. No. 539,154, Jun. 18, 1990, abandoned, Ser. No. 578,395, Sep. 7, 1990, abandoned, Ser. No. 711,094, Jun. 6, 1991, abandoned, and Ser. No. 884,124, May 18, 1992, abandoned.

[51] Int. Cl.$^6$ ........................................... D04B 23/08
[52] U.S. Cl. ...................... 66/192; 66/190; 66/196; 66/202; 156/148; 156/296; 156/298; 156/308.2; 427/385.5
[58] Field of Search ........................ 66/190, 192, 196, 66/202; 156/148, 296, 298, 308.2; 428/253, 300, 296; 427/385.5

[56] References Cited

U.S. PATENT DOCUMENTS 4,565,735  1/1986  Murka et al. .......................... 438/300

OTHER PUBLICATIONS

"Fabrics for Vertical Blinds Produced on Tricot and Raschel Machines," Kettenwirk–Praxis, Mar. 1991, pp. E36–E37 (English version); pp. 71–73 (German text plus pictures).

*Primary Examiner*—James J. Bell
*Attorney, Agent, or Firm*—Nixon & Vanderhye

[57] ABSTRACT

A woven or non-woven fibrous material has a substrate formed of first and second thermoplastic fibers. The fabric is passed through an oven at a temperature sufficient to melt the first fibers thereby fusing at least some of the first fibers and second fibers one to the other. The second fibers retain their discrete definition within the composite whereby the composite is provided such that, when cut for use, for example, to form a slat of a vertical blind or a wall panel, the composite retains its shape. A foam backing is provided and cured in the oven simultaneously with the melting of the first fibers.

20 Claims, 13 Drawing Sheets

FIG. 8
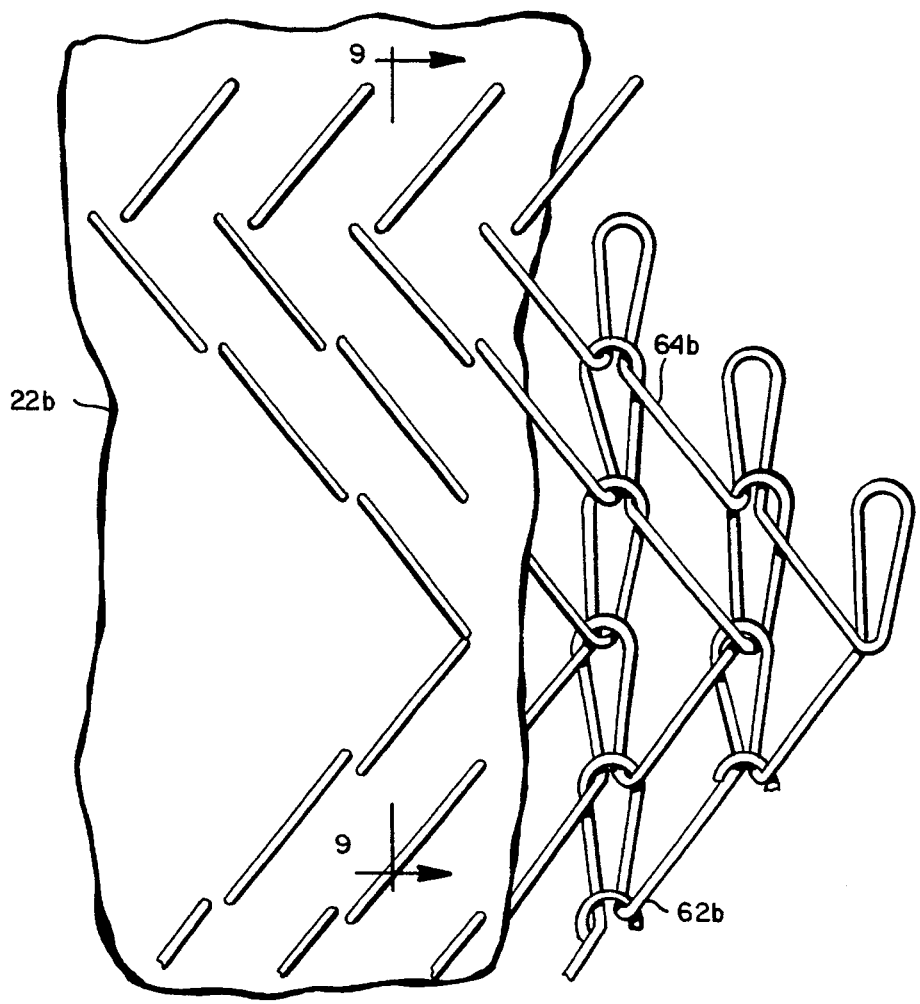
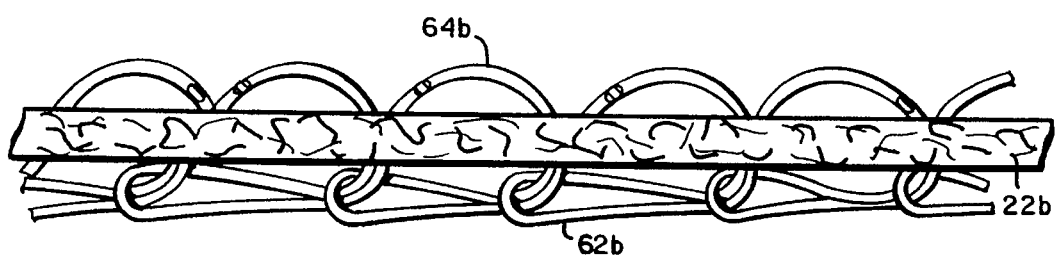
FIG. 9

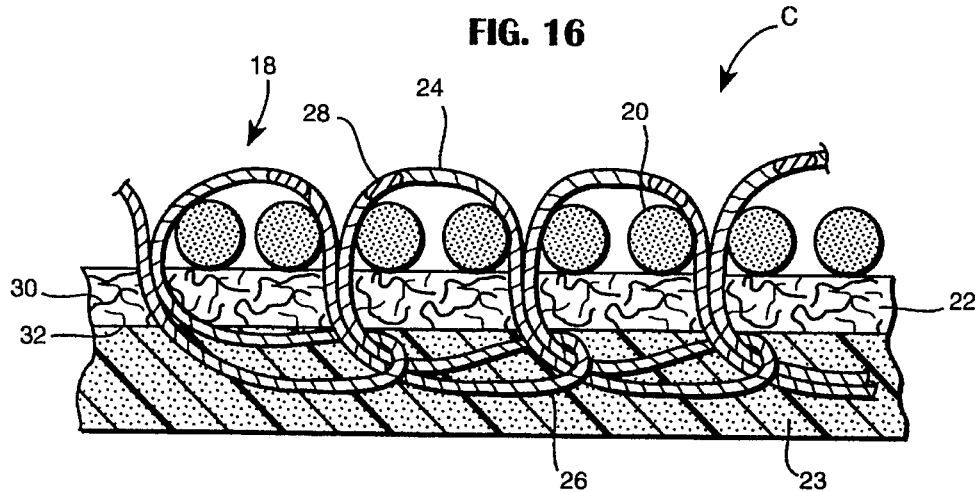
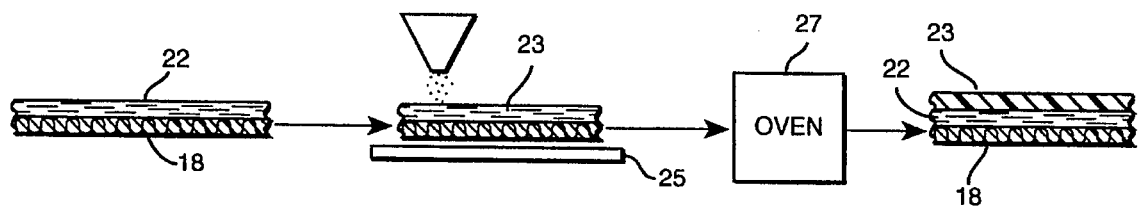
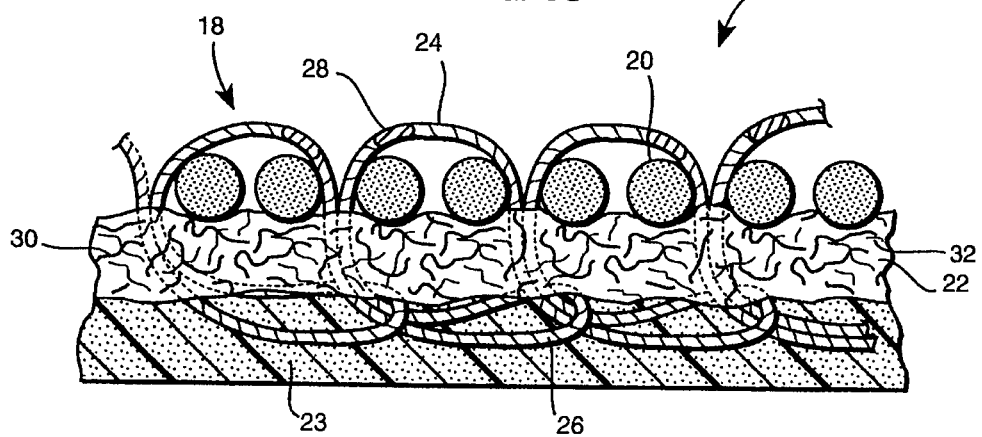

STIFF FABRIC COMPOSITE AND METHOD OF MAKING

RELATED APPLICATIONS

This is a divisional of application Ser. No. 08/111,521, filed Aug. 25, 1993, now U.S. Pat. No. 5,436,064 which is a continuation-in-part of application Ser. No. 07/900,460, filed Jun. 18, 1992 abandoned and applications Ser. Nos. 07/539,154, filed Jun. 18, 1990 abandoned; 07/578,395, filed Sep. 7, 1990 abandoned; 07/711,094, filed Jun. 6, 1991 abandoned and 07/884,124, filed May 18, 1992, abandoned the disclosures of which are incorporated herein by reference.

TECHNICAL FIELD

The present invention relates to a stiff fabric composite for various uses including, for example, slats or vanes for vertical blinds, pleated shades, coverings for the housings for the vertical blinds, automobile interior parts, furniture panels, large and small wall panels, partitions and the like. The present invention also relates to methods of making the stiff fabric composite.

BACKGROUND

Fabrics are and have been used for a large variety of articles. The ease of manufacture of fabrics in many different colors, textures, patterns and raw materials lends their use in a wide variety of applications. The flexible nature of fabrics, however, frequently is a detriment to their application and end use. This will become apparent from the following discussion of the use of fabrics in vertical blinds and in other window treatments and coverings, for example, fabric tiles and wall panels, representative of the ofttimes desirable but sometimes disadvantageous flexibility of the fabrics.

Window treatments are conventionally categorized as soft and hard treatments. For example, soft window treatments might include draperies, curtains and the like for windows or walls where the fabric forming the draperies or curtains is typically decorative and highly flexible. That is, they do not have a stiffness attributable to the fabric per se such that the fabric may have a self-supporting shape. Hard window treatments, on the other hand, may include blinds, both vertical and horizontal, including mini-blinds as well as pleated shades. This latter segment of the window treatment market has grown rapidly, much to the detriment of the soft window treatment market. That is to say, the materials normally employed in the hard window treatment market from which vertical and horizontal blinds are made, for example, might comprise relatively inflexible plastic material, such as PVC, or aluminum, shaped to have a degree of stiffness or rigidity. Very little of the hard window treatment market includes fabric materials, although certain vertical blinds have previously been formed of treated, non-woven, as well as woven, fabrics. For example, there has been previously provided a stitch-through drapery fabric which may have various surface effects, ranging from casements to textures and which has been treated with resins or a polymer to achieve a stiff, self-supporting slat for vertical blinds. However, the treatment is a separate step, not part of the fabric formation and is thus limited to the addition of further materials to the fabric beyond those necessary to make it.

Also, there has been increasingly a demand for hard window treatments having a more elegant drapery look. Such fabrics have to be finished in such a way that they have sufficient stiffness to make them suitable for such window coverings. The finishing processes required for this purpose are difficult, lengthy and expensive. The physical properties of the resulting fabrics are not always satisfactory because high humidity and heat, as typically occurs at a window, cause a variation from the predetermined finished shape. For example, vertical slats or vanes formed of finished fabric materials will sometimes cup-in, i.e., form a non-controllable convex or concave surface, rather than retain a flat surface configuration, as desired. Alternately, original cup-shaped slats may become flat or obtain other shapes upon application of heat and/or humidity. Loss of definition has been found to be especially true with woven fabrics made mostly with rayon wefts.

Fabric coverings for tiles and wall panels are other examples of the undesirable flexibility of fabric for certain applications, although other attributes of fabrics, such as ready and inexpensive manufacture, wide variations in color, patterns, texture, etc., make their use highly desirable as wall panels. For example, fabric coated wallpaper is relatively difficult to apply to a wall due in no small part to the flexibility of the fabric itself. Usually, a professional wallpaper hanger is required. Flexible fabrics are also difficult to cut to the required size and shape. Consequently, the oftentimes highly desirable characteristic of flexibility is frequently detrimental to the use of fabrics in certain applications. Thus, there has developed a need for a stiff fabric composite which obtains and retains during use a predetermined stiffness but which does not require further treatments such as the application of additional materials to the fabric to obtain and retain the stiffness.

DISCLOSURE OF THE INVENTION

According to the present invention, there is provided a stiff fabric composite which, when heat-treated and subsequently cooled, will provide the requisite stiffness for the use contemplated, for example, as slats in vertical or mini-blinds, pleated shades, folding doors, wall panels, wall tiles, etc., and which fabric will not alter its self-sustaining well-defined shape in the presence of high humidity and/or heat. To accomplish this, the stiff fabric composite may, in one form hereof, be formed of a non-woven warp knit, stitch through, stitch bonded, warp-knit weft-inserted fabric or a woven fabric each in conjunction with a substrate comprised of a single type of fiber or a blend of fibers rendering the substrate thermally formable or thermobondable to impart the requisite stiffness to the resulting fabric. Warp-knit, weft-inserted ;fabrics have, in recent years, come into vogue with fabric designers for applications typically reserved for woven fabrics. For example, in decorative markets such as window treatments, warp-knit, weft-inserted fabrics have recently been used as drapery fabrics. These fabrics have become popular, in lieu of woven fabrics, because of their versatility and the economics of manufacture. Importantly, they retain the appearance of and resemblance to woven fabrics. Warp-knit (stitch through) fabrics without weft insertion have also come into vogue. Their patterning in the fabric is derived from the movement and type of the stitching yarns or their layering. While warp-knit fabrics do not obtain a woven appearance, they are quite useful in certain applications, such as window treatments.

The substrate used with either the warp-knit, warp-knit weft-inserted, stitch-through, stitch-bonded, (non-woven) or woven fabric, for example and preferably, may be a mixture of two different types of thermoplastic fibers or as sometimes desired only one type of fibers, such as polyester, or polyolefin fibers, e.g., polypropylene or polyethylene, having different melting temperatures or times. When the substrate material, which may be needle-punched to intersperse the fibers throughout the substrate, is subjected to a heat treatment in the manufacturing process, for example, disposed in an oven having an operating temperature above the melting temperature of one of the first fibers but below the melting temperature of the other fibers, at least some of the first fibers may fuse in the substrate to stiffen the resulting fabric to the required degree of stiffness. Even though some substrates are designed this way, others, especially polyolefin-based ones, may or may not have only one type of fiber. Where only a single type of fiber is employed, first and second fibers may have different thicknesses, for example, such that at least some of the first fibers of one thickness fuse in the substrate while the second fibers of greater thickness remain intact with substantial definition. Substrates of the foregoing types may be variously formed and the substrates and techniques for making the substrates may, for example, be of the type disclosed in U.S. Pat. No. 4,818,586, issued Apr. 4, 1989; U.S. Pat. No. 4,424,250, issued Jan. 3, 1984 and U.S. Pat. No. 4,199,635, issued Apr. 22, 1980, the disclosures of which are incorporated herein by reference. A commercial form of the substrate for use with the present invention may be obtained from Gates Formed Fiber Products, Inc., Auburn, Me., under the designation C-107C 6.5 ounce/sqy polyester, Foss Manufacturing, Hampton, N.H., identified as 24-Y-4 7.5 oz/yd$^2$ or from Spartan Technologies, Spartanburg, S.C., identified as N470 8 ounce/sqy polypropylene. Another apparently useful substrate available from Foss Manufacturing is a blend of different polyester fibers, these constituents being available in various proportions. If the Gates substrate is used, heating of the non-woven fabric to 325° F. for 90 seconds has been found to be sufficient to impart the desired stiffness. Other possible substrates include Delnet, a product of Extrusion Technology Co. of Middletown, Del.

With a 100% olefin fiber substrate from Spartan Technologies, a temperature of about 310° to 360° F. with a dwell time of 45–90 seconds is desirably used. At higher temperatures and longer dwell times, a stiffer and thinner product is obtained, and the precise conditions may be varied as desired to yield the properties desired. For example, for the manufacture of pleated shades, a thinner product is desired, so operation at the higher temperatures and longer dwell times is preferred.

Generally speaking, this technique, when used for forming a warp-knit, weft-inserted fabric or a warp-knit fabric using meltable and fusible fibers of a fibrous substrate, provides added dimensional stability to what otherwise might be a poorly stabilized fabric. For example, while a satin stitch in a warp-knit, weft-inserted fabric provides a most pleasing woven-like construction, it is one of the poorer dimensionally stable warp-knit, weft-inserted fabrics available. However, it has been found that by combining that fabric with the substrate identified above, the resulting fabric may not only be dimensionally stabilized but has the requisite stiffness for the uses contemplated herein. Furthermore, tests of this particular fabric have demonstrated that, when subjected to high temperatures, for example, 150° F. and high humidity, i.e., 65%, the fabric did not change its predetermined shape. This product has also been tested at 90° F. and 90% relative humidity with similar results. Even wetting the fabric did not cause it to change shape or lose definition.

When using a combination of a woven fabric and non-woven substrate for the composite fabric hereof, the non-woven substrate is preferably needled to the woven fabric. That is, the needles move certain of the substrate fibers into the woven fabric and some of the non-woven fibers will extend through the woven fabric to its opposite face. When this fabric composite is later subjected to a heat treatment in the manufacturing process, for example, disposed in an oven having an operating temperature above the melting temperature of one of the thermoplastic fibers of the substrate, but below the melting temperature of the other fibers, at least some of the first fibers may fuse in the substrate and to the back of the woven fabric. Also, of those first fibers needled into and through the woven fabric, at least some fuse within and on the face of the woven fabric, thus affording a strong bond between the substrate and the woven fabric. Importantly, the fusing action stiffens the resulting fabric composite to the required degree of stiffness.

In a further aspect of the present invention, there is provided a foam backing to a stiff composite fabric, such as a stiff composite fabric of the type set forth in prior application Ser. No. 07/900,460 and to the additional composite fabrics set forth herein. As disclosed in U.S. Pat. No. 4,362,774, of common assignee herewith, the disclosure of which is incorporated herein by reference, a foam backed fabric is highly desirable for a number of purposes, particularly for drapery fabrics or blinds. In that patent, there is disclosed a process for applying an acrylic latex foam which is provided with short fiber cotton flocking. The foam is applied to the fabric and ultimately passed to a curing station where it is heated and cured. In accordance with the present invention, it has been found desirable to not only provide a stiff composite fabric having a foam backing, but also that the fabric material and the substrate may be combined with the foam, prior to curing, and passed through an oven to simultaneously fuse the substrate and cure the foam. Consequently, prior to heating and curing various finishes can be applied to the composite fabric by spraying or dipping and the foam acrylic latex may be applied to the back of the composite. The composite may then be passed through an oven to fuse the fibers of the substrate, dry and cure the finish and dry and cure the foam. Thus, only one pass through an oven is necessary. Additional advantages of the composite fabric with the foamed acrylic backing applied thereto include a softer, smoother hand with more eye appeal. Also, a smooth surface, pleasing to the touch, is provided instead of the stiff rough surface formed by melting and stiffening of the fibers of the substrate. Further, the foam reduces the amount of light that can pass through the composite. This has particular applicability when the composite fabric hereof is used for blinds.

A further aspect of the present invention resides in employing an adhesive to bond the substrate and fabric material to one another. In a first form, either the fabric or substrate may be coated, for example, by either knife-coating or screen-coating, with an aqueous adhesive based on acrylic, polyvinyl acetate or other polymeric materials. Screen-coating permits the application of the adhesive in the form of dots to the fabric or substrate. However, for purposes of stiffening the composite, the adhesive is preferably applied as a solid film. When the fabric material and substrate are brought together, the adhesive cold-bonds the two materials to one another. The substrate is then later fused in an oven to afford additional stiffening characteristics. Needle punching is not required and the subsequent fusing may be accomplished with or without the foam backing.

A hot-melt adhesive may also be used. To accomplish this, a hot melt adhesive, such as a polyethylene based polymer, may be applied to the back of the fabric. After the fabric and substrate are brought together, it is preferable to simultaneously adhere the fabric material and substrate to one another while the substrate is being fused to achieve the stiffening characteristics of the composite hereof. Thus, only a single pass through a heater e.g., an oven, is necessary. The composite may also include the foam backing which is cured in that same single pass through the heater.

In a further form, a fusible net may be disposed between the substrate and fabric. When heated, the fabric and substrate are bonded together by the fused net and simultaneously, the substrate fibers are fused thereby to produce the stiffened composite. Again, the foam backing may be applied or not during the single pass through the heater.

As a further alternative, a partially fused substrate, for example, fused previously by heating, is treated by sifting a powdered adhesive such as a polyester adhesive, onto its surface. The treated substrate is passed through an oven to melt the powdered adhesive. Upon emergence from the oven, the substrate is brought together with the fabric material and the resultant composite is squeezed through rolls to produce intimate contact between the substrate and woven fabric, bonding the fabrics to one another. In this way, the fabric is not subjected to high temperatures which frequently degrade the fabric, for example, by changing its color. If the foam backing is required, the foam may be applied in liquid form and subsequently cured by passing the composite with foam applied through an oven at lower temperatures sufficient for curing but not sufficiently high to cause fabric or color degradation.

Certain techniques and composite fabrics have also been developed. For example, it has been found that change of color and product degradation occur with respect to certain fabrics such as Supreme Satin, a combination of acetate and rayon yarns, when subject to high temperatures. In accordance with the present invention, this fabric is laminated to two different substrates in a heat transfer/warp print machine. The fabric material is disposed in the heat transfer machine about a drum with an overlying substrate of thermoplastic material and a further overlying substrate of a non-fusible material. After lamination of the fusible substrate and fabric material on the heated drum, the non-fusible material is either left on the composite fabric or removed therefrom, depending upon the temperature to which the composite was subjected during lamination. While a certain weight of thermofusible fabric, for example, 7.5 oz./yd., works well with the acetate and rayon fabric, it has been found that other fabric materials, for example, 100% polyester fabric, can be laminated using a lesser weight of thermofusible fabric, for example, between 2.8 and 7.0 oz./yd. Further, the order of the fabric, thermofusible substrate and non-thermofusible substrate about the heated drum can be reversed, particularly where it is desirable to transfer a print on the fabric material. Thus, transfer print paper may be positioned between the heated drum and the fabric material, with the thermofusible and non-thermofusible materials overlaying the fabric material about the heated drum.

It has also been found that the lamination process hereof can be used to form a fabric suitable for drapery or vertical blinds from yarns off a warp beam used on looms, the yarns of the warp beam entering the heat transfer apparatus with the fusible and non-fusible substrates. The materials may be processed to form the stiff fabric composite hereof.

It has been found desirable to use a non-fusible substrate entirely with the fabric in order to provide a stiff composite fabric. In this form, a low-melt polyester powder is applied onto the surface of the non-fusible substrate and the powder and substrate are subsequently heated. Upon exiting the oven, a fabric is introduced onto the molten polyester powder and substrate. This composite is passed through rollers to press the components together and cool the polyester powder to achieve a bond between the fabric and substrate. In this manner, fabrics made from fibers which have heat-sensitive colors show very little, if any, color change as compared to the heat transfer lamination techniques previously described. This is because the fabric is only exposed to the residual heat of the existing molten polyester powder.

A further advantage of the stiff fabric composite according to the present invention, whether the substrate is combined with the warp-knit, weft-inserted; warp-knit (stitch-through); or woven fabrics, particularly when thermoplastic yarns, for example, polyester and polyolefins, are used as the weft yarns and warp stitching (and laid in warps where used) in warp-knit fabric or both the warp and weft yarns in warp-knit, weft-inserted fabric, is that the fabric may be readily cut to the desired shape. For example, by employing hot knives to slit warp-knit, weft-inserted fabric, in the machine direction, not only the wefts and knitting yarns can be cut, but the hot knives fuse the ends of the cuts to the substrate, preventing fraying along the selvage. Fusing, of course, also occurs when using hot knives to cut in the cross-machine direction. This cutting may be employed either at the fabricating site or installation site, depending upon the use of the fabric.

It will be appreciated that there are a great variety of uses of the stiff fabric composite hereof. For example, the stiff composite fabric may form wall panels of the large variety type, on the order of four feet by eight feet or larger or smaller. Thus, unlike wood panelling, the stiff fabric composite panelling may be cut with scissors and glued to an underlying wall rather than being sawed or nailed. While the fabric is stiff, it still retains the capability to bend, for example, around corners, thereby facilitating installation. Such stiff fabric composite panels are also lighter in weight and therefore easy to handle and install. Square tiles of the stiff composite fabric, e.g., on the order of one-foot square, may also be formed and in many different colors, patterns, textures and the like. Similarly, the tiles can be rectangular, e.g., in the form of bricks on the order of 3½×8 inches. Thus, many and different decorative wall or ceiling effects can be provided and with simple or complex patterns, e.g., Dobby or Jacquard.

In a preferred embodiment according to the present invention, there is provided a stiff fabric composite comprising a fibrous woven or non-woven material, a non-woven substrate of thermoplastic fibers, the fabric composite having been heated to a temperature sufficient to fuse at least some of the fibers of the substrate to one another to provide the fabric composite with a stiffness such that a flat piece of the composite 3.5 inches (about 90 mm) wide cantilevered in a horizontal direction five inches (130 mm) from a support has a droop at its distal end of from preferably about 0 to about 2 inches (or about 0 to about 50 mm). A range of about 0.5 inches to about 2.5 inches (or about 10 to about 70 mm) will be satisfactory.

In a further preferred embodiment according to the present invention, there is provided a fabric having incorporated therein a substrate formed of first and second fibers, the first fibers being formed of a thermoplastic material having a predetermined melting temperature, the fabric having been heat-treated to a predetermined temperature sufficient to melt at least some of the first fibers such that the first fibers are fused with the second fibers in the substrate to provide a fabric having a predetermined stiffness. Different substrate suppliers may formulate their substrates in different ways, so that heat treatments should be varied in accordance with such variations to achieve the desired stiffness. Additionally, the fabric may be either a warp-knit (stitch through) fabric with or without laid-in warp yarns or a warp-knit, weft-inserted fabric with or without laid-in warp yarns.

In a further preferred embodiment according to the present invention, there is provided a warp-knit, weft-inserted fabric having incorporated therein a substrate formed of first and second fibers, the first fibers being formed of a thermoplastic material with at least some of the first fibers fused to the second fibers, which may be heat-treated if desired, in either case to provide the fabric having a stiffness such that a flat piece of the fabric 3.5 inches (about 90 mm) wide cantilevered in a horizontal direction 5 inches (130 mm) from a support has a droop at its distal end of no more than about 2.0 inches (about 50 mm).

According to the present invention, such material can be formed into a blind for a window treatment comprising a plurality of slats, each slat being formed of the warp-knit, weft-inserted fabric having the same droop characteristics.

In another aspect hereof, there is provided a warp-knit fabric having incorporated therein a substrate formed of thermoplastic fibers having a predetermined melting temperature, the fabric having been heat-treated to a predetermined temperature sufficient to melt at least some of the fibers such that the fibers are fused in the substrate to provide a fabric having a predetermined stiffness.

In a further preferred embodiment according to the present invention, there is provided a blind for a window treatment comprising a plurality of slats, each slat being formed of stitch through warp yarns and fabric having a substrate formed of first and second fibers, the first fibers being formed of a thermoplastic material having a predetermined melting temperature, the fabric having been heat-treated to a predetermined temperature sufficient to melt at least some of the first fibers such that some of the first fibers are fused with the second fibers in the substrate to provide a slat having a predetermined stiffness.

In a still further preferred embodiment according to the present invention, there is provided a method of forming a fabric having stitch through warp yarns and a substrate comprising the steps of, on a knitting machine, (a) providing a non-woven substrate for movement in the machine direction and formed of first and second different fibers with the first fibers formed of thermoplastic material having a predetermined melting temperature, and (b) stitching the warp yarns and substrate each to the other and thereafter, heating the fabric to a temperature to fuse at least some of the first fibers with the second fibers of the substrate to provide a predetermined stiffness to the fabric. The method hereof may further include laying in weft yarns in the cross-machine direction to form a warp-knit, weft-inserted fabric.

In a further embodiment according to the present invention, there is provided a stiff fabric composite comprising a fabric material, a substrate formed of first and second fibers of a thermoplastic material secured to one side of the fabric material and a polymeric foam on the side of the substrate remote from the fabric material. The composite has been heat treated to a predetermined temperature sufficient (i) to melt the first fibers such that the first fibers are fused with the second fibers in the substrate or with the fabric material and (ii) to cure the polymeric foam to provide a composite having a predetermined stiffness with the second fibers remaining substantially wholly unmelted during the heat treatment.

In a further preferred embodiment according to the present invention, there is provided a stiff fabric composite comprising a fabric material, a substrate of first and second discrete fibers of a thermoplastic material and an adhesive between the fabric and the substrate for bonding the fabric and the substrate to one another. The first fibers are fused in the substrate to provide a composite having a predetermined stiffness with the second fibers remaining substantially unfused and as discrete fibers in the substrate.

In a further preferred embodiment according to the present invention, there is provided a stiff fabric composite comprising a fabric material, a non-fusible substrate and a polymeric material between the fabric material and the non-fusible substrate fused to bond the fabric material and the non-fusible substrate to one another.

In a still further preferred embodiment according to the present invention, there is provided a method of forming a stiff fabric having stitch through warp yarns, a substrate and a foam backing comprising the steps of, on a knitting machine, (a) providing a non-woven substrate for movement in the machine direction formed of first and second different fibers with the first fibers formed of thermoplastic material having a predetermined melting temperature, and (b) stitching the warp yarns and substrate each to the other, applying a foamed or foamable composition of a polymeric material to one side of the substrate and thereafter, heating the fabric, substrate and foamed or foamable composition simultaneously to a temperature to (i) fuse the first fibers with the second fibers of the substrate to provide a predetermined stiffness to the fabric while retaining the definition of the second fibers as fibers in the fabric and (ii) cure the foamed or foamable composition to form a stiff fabric composite with a foam backing.

In a still further preferred embodiment according to the present invention, there is provided a method of forming a stiff fabric composite comprising the steps of needling a non-woven substrate formed of thermoplastic fibers and a woven material one to the other and heating the needled non-woven substrate, woven material and foamed or foamable composition simultaneously to a temperature to (i) fuse at least some of the fibers in the substrate and (ii) cure the foamed or foamable composition to provide a fabric composite with foam backing of predetermined stiffness.

In a still further preferred embodiment according to the present invention, there is provided a method of forming a stiff fabric composite comprising the steps of fusing only a portion of the fibers of a substrate, leaving a remaining portion unfused, applying an adhesive to a surface of the partially fused substrate, heating the partially fused substrate with adhesive applied thereto to melt the adhesive and thereafter adhering a fabric to the substrate with the adhesive forming a bond therebetween.

In a still further preferred embodiment according to the present invention, there is provided a method of forming a stiff fabric composite comprising the steps of applying an adhesive to one of a substrate having first and second thermoplastic fibers and a fabric, laminating the substrate and the fabric to one another with the adhesive bonding the substrate and fabric to one another and heating the laminated substrate and fabric to a predetermined temperature sufficient to melt the first fibers such that the first fibers are fused with the second fibers in the substrate to provide a composite having a predetermined stiffness, with the second fibers remaining substantially wholly unmelted during heating.

Alternatively, instead of an adhesive, in another embodiment of the invention, a fusible material is disposed between the substrate and the fabric to laminate the substrate, fusible material and fabric to one another by heating to a predetermined temperature.

In a still further preferred embodiment according to the present invention, there is provided a method of forming a stiff fabric composite including the steps of passing a fabric formed of acetate and rayon yarns, a substrate having thermoplastic fibers and a spunbonded polyester through a heat transfer/warp print machine and heating the fabric to a temperature sufficient to melt certain of the fibers in the substrate for fusing with unmelted fibers in the substrate to provide a composite having a predetermined thickness with certain fibers remaining substantially wholly unmelted during heating.

Accordingly, it is a primary object of the present invention to provide a novel and improved composite fabric with a substrate, with or without a backing foam, wherein the fabric may be formed into a stiff, self-supporting and sustaining fabric piece, for example, for hard window treatments and other end uses where a stiff fabric may be desired.

These and further objects and advantages of the present invention will become more apparent upon reference to the following specification, appended claims and drawings.

BRIEF DESCRIPTION OF THE DRAWINGS

FIG. 8 is a view similar to FIG. 6 illustrating a different warp-knit stitch pattern;

FIG. 9 is a cross-sectional view thereof taken generally about on line 9—9 in FIG. 8;

FIG. 16 is a view similar to FIG. 3 with the fabric having a foam backing applied;

FIG. 17 illustrates a method of forming the composite fabric with a foam backing;

FIG. 18 is a view similar to FIG. 16 illustrating the fabric and foam backing of FIG. 17 after heat treatment;

BEST MODE FOR CARRYING OUT THE INVENTION

Reference will now be made in detail to the present preferred embodiment of the invention, an example of which is illustrated in the accompanying drawings.

Figure 1:
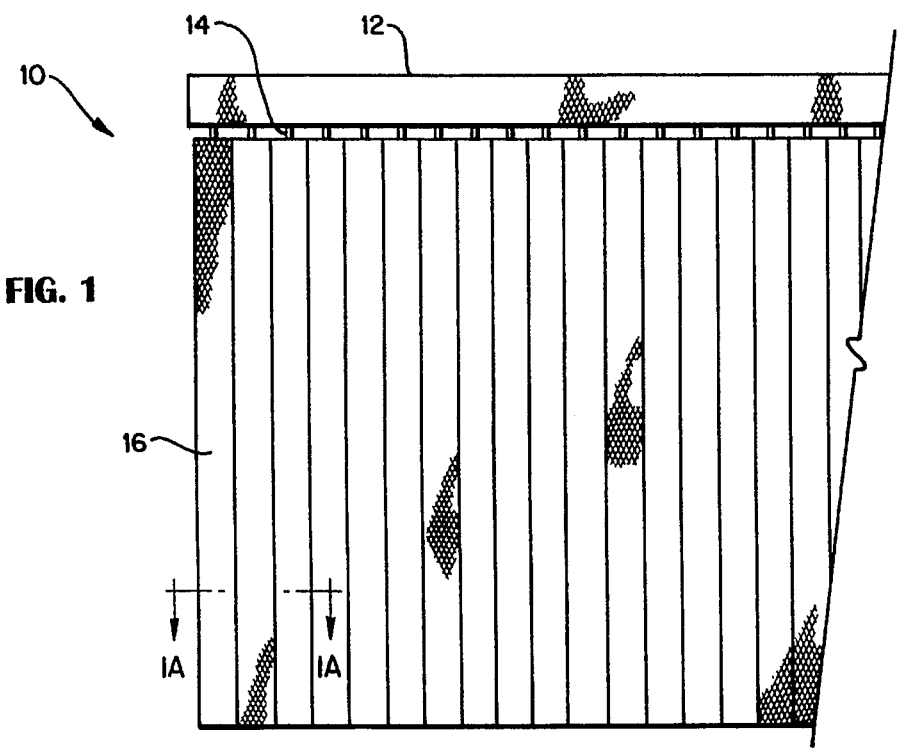
FIG. 1 is a fragmentary elevational view of vertical blinds formed of a fabric constructed in accordance with the present invention.
Figure 2:
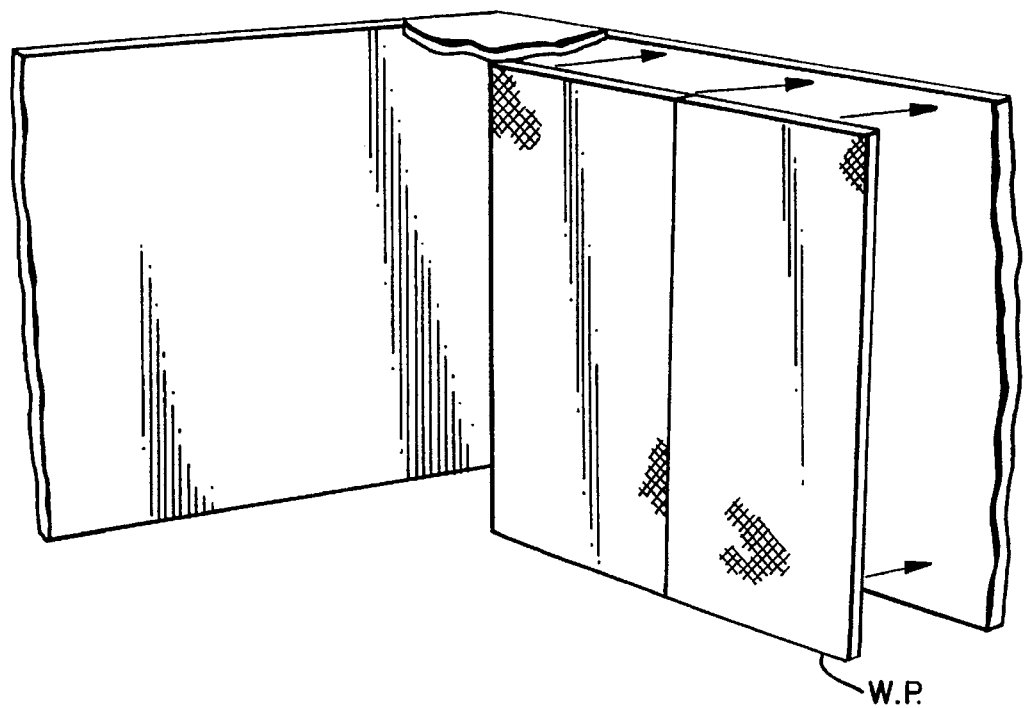
FIG. 2 is a fragmentary perspective view illustrating use of the stiff fabric composite as a wall panel.
Figure 3:
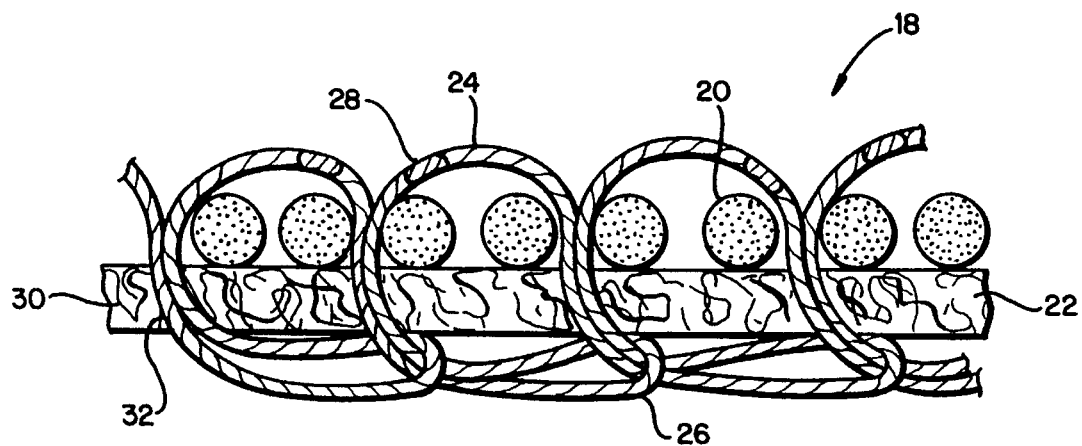
FIG. 3 is an enlarged cross-sectional view of a fabric, constructed in accordance with the present invention, formed by the process illustrated schematically in FIG. 4.
Figure 5:
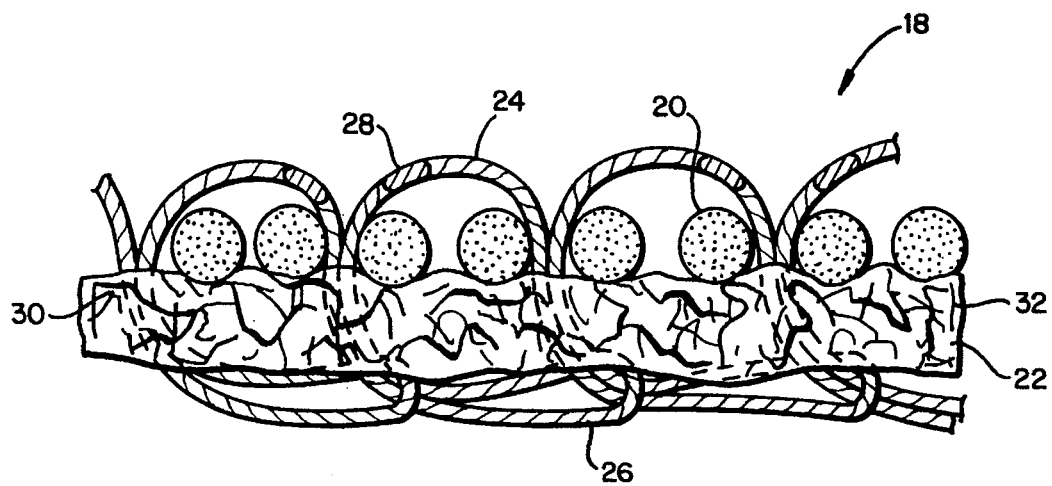
FIG. 5 is a view similar to FIG. 3, illustrating the fabric after the heat treatment in the process of FIG. 4.
Figure 4:
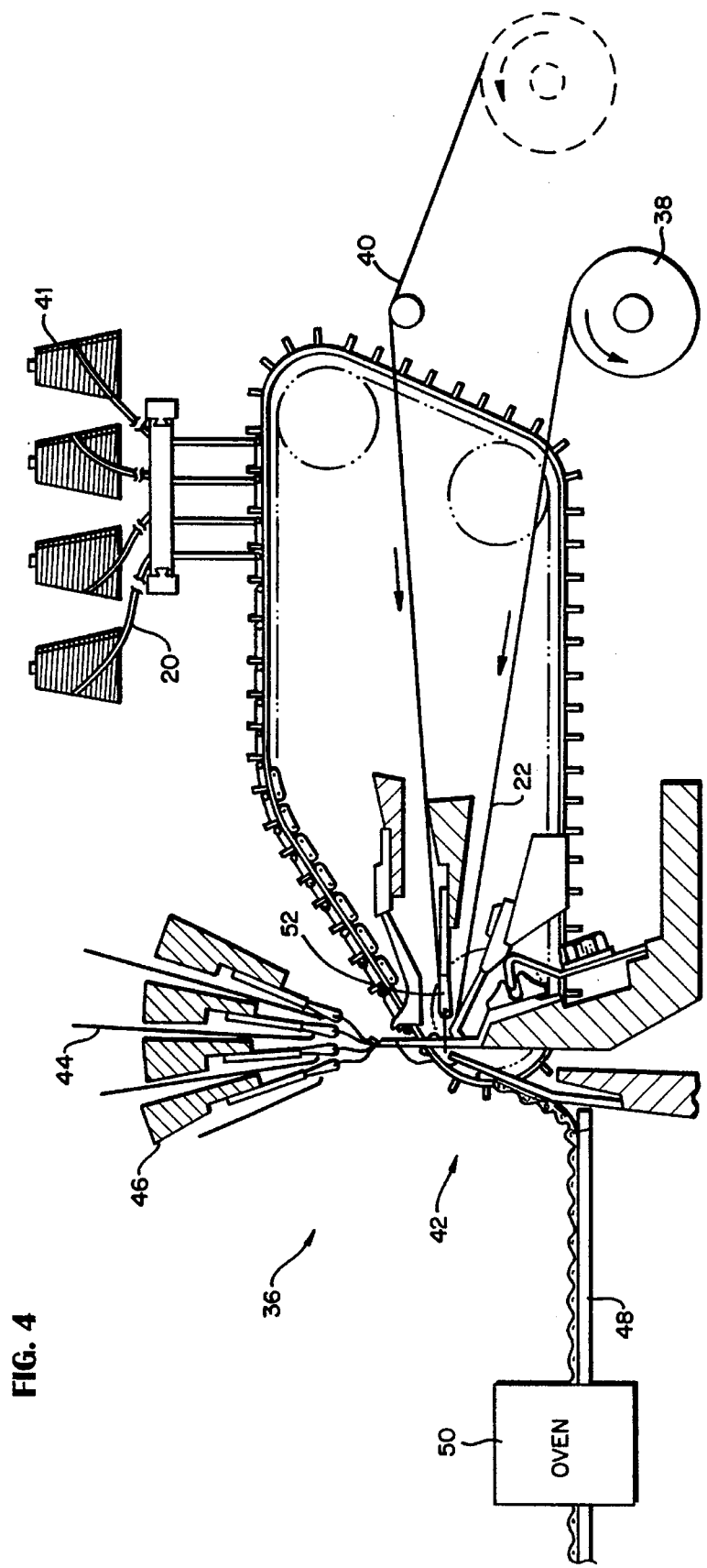
FIG. 4 is a schematic representation of a warp-knit, weft-inserted fabric with follow-on processes for applying a foam backing to the fabric hereof.
Figure 12:
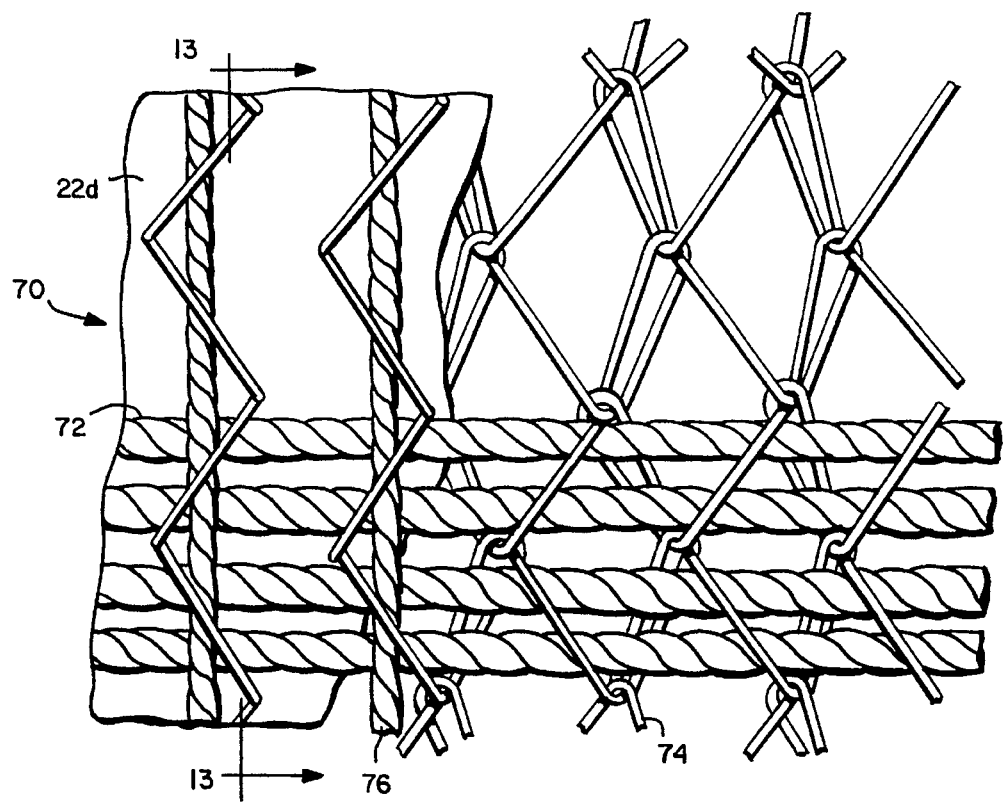
FIG. 12 is a view similar to FIG. 6 illustrating a warp-knit weft-inserted fabric having a different stitch construction with additional laid-in warp yarns.
Figure 13:
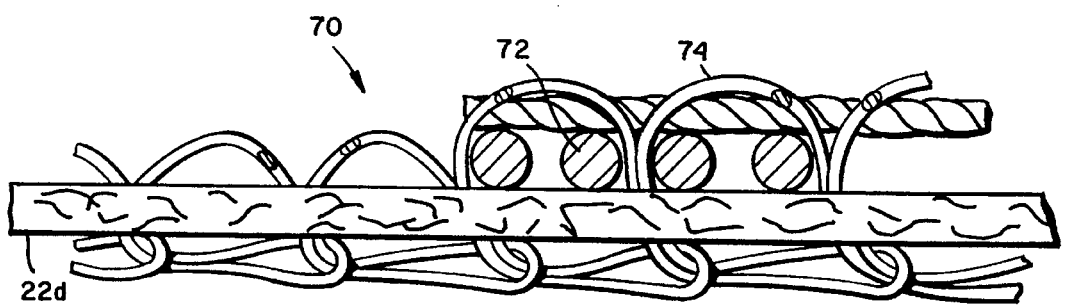
FIG. 13 is a cross-sectional view thereof taken generally about on lines 13—13 in FIG. 12.
Figure 14:
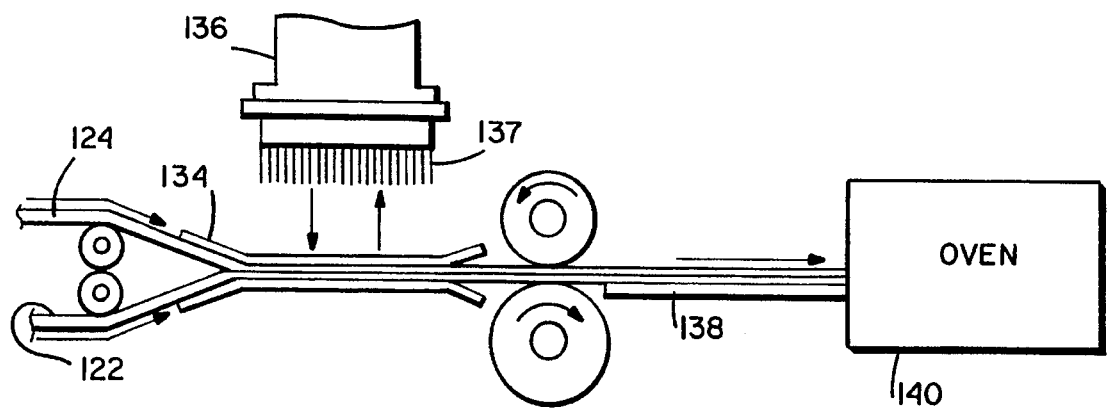
FIG. 14 is a schematic representation of another process for forming a stiff fabric composite according to the present invention.
Figure 15:
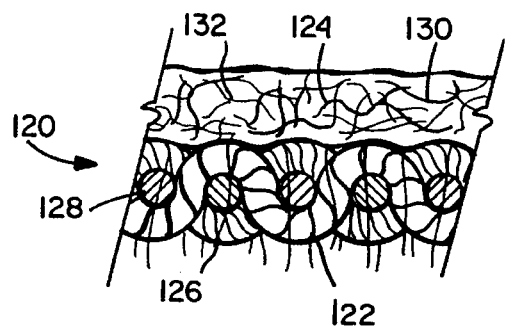
FIG. 15 is an enlarged cross-sectional view of a stiff fabric composite constructed in accordance with the present invention on the needle punch machine illustrated schematically in FIG. 14.

For clarity, FIGS. 1 and 2 illustrate representative examples of products in which the stiff fabric composite of the present invention may be embodied, the two products illustrated being vertical slats for blinds and wall panels, respectively. FIGS. 3 and 5 illustrate a warp-knit, weft-inserted fabric; FIG. 4 illustrates apparatus for forming a warp-knit, weft-inserted fabric with laid-in warp yarns, it being appreciated that the apparatus for laying in the weft yarns as illustrated in FIG. 4 may be omitted whereby a warp-knit fabric, with or without laid-in warp yarns may be provided; FIGS. 6–11 illustrate a warp-knit fabric; FIGS. 12 and 13 illustrate a different warp-knit, weft-inserted fabric with laid-in warp yarns; FIG. 14 illustrates a method of making a stiff fabric composite using a woven fabric and a non-woven substrate; FIG. 15 illustrates the stiff fabric composite formed by the process of FIG. 14; FIGS. 16 and 18 illustrate the fabric composite of FIG. 3 with a foam backing; FIG. 17 illustrates a method of making the composite fabric of FIGS. 16 and 18; FIG. 9 illustrates the fabric of FIG. 15 with a foam backing; and FIGS. 20–26 illustrate various methods of forming stiff composite fabrics.

Figure 1A:
FIG. 1A is a fragmentary enlarged cross-sectional view thereof taken generally about on lines 1A—1A in FIG. 1.

Referring to FIG. 1, there is illustrated a vertical blind, generally designated 10, comprising a housing 12 for movably supporting, by means of pins 14, a plurality of vertically disposed slats or vanes 16, hereafter referred to as slats 16. The housing 12 contains the conventional track and mechanisms for displacing the blinds horizontally and rotating slats 16 about vertical axes. The slats 16 are formed of a stiff fabric composite constructed in accordance with the present invention, and which slats have a self-sustaining, self-supporting shape, unaffected by environmentally anticipated heat and humidity. Thus, the shape of the slat, whether it is flat (FIG. 1A) or cup-shaped, is maintained by the fabric itself.

Figure 1B:
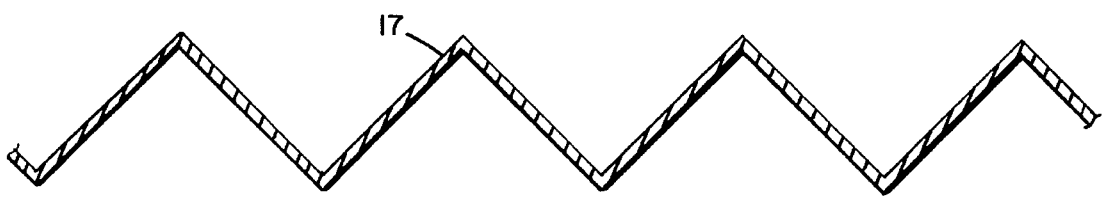
FIG. 1B is a view similar to FIG. 1A but illustrating use of the stiff fabric composite hereof in pleated blinds.

In FIG. 1B, there is illustrated pleated blinds. The material for the pleated blinds may be lighter than that forming the blinds of FIGS. 1 and 1A. However, the same type of materials may be used.

Figure 2A:
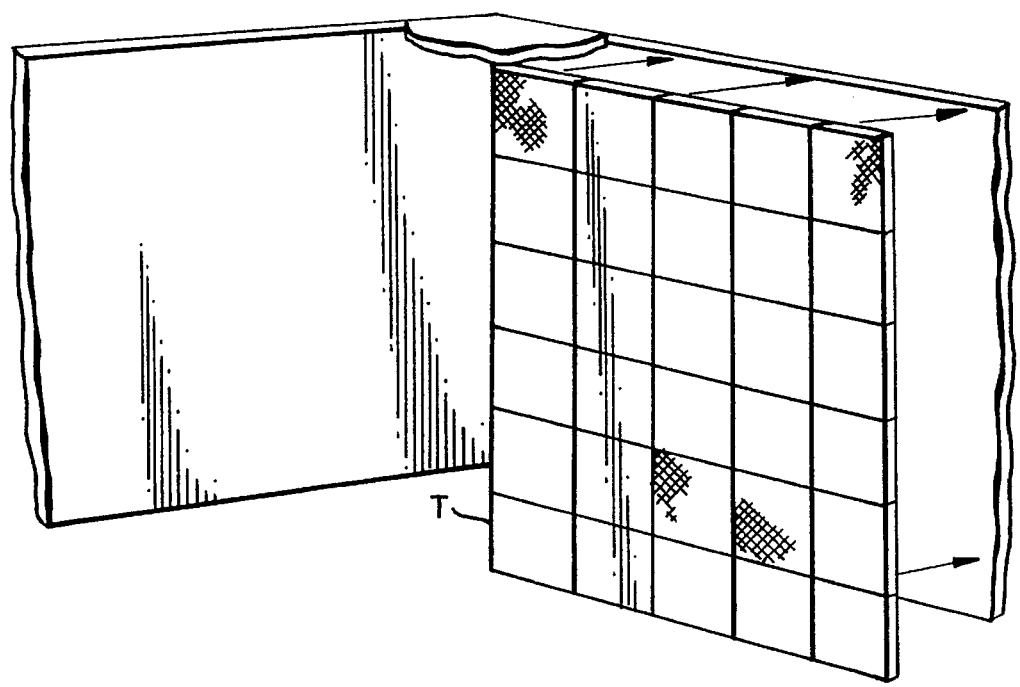
FIG. 2A is a fragmentary perspective view illustrating use of the stiff fabric composite as a wall tile.

In FIG. 2, there is illustrated a plurality of large wall panels W.P., e.g., 4×8 foot panels, formed of the stiff fabric composite hereof and applied to adjoining walls. FIG. 2A illustrates small tiles T of the stiff fabric composite hereof. The tiles T may, for example, be one-foot-square tiles or smaller or larger as desired. Of course, because of the ease of cutting the composite hereof with scissors, it will be appreciated that panels, tiles, etc. can be provided in different sizes, colors, patterns and textures, as desired. With respect to panels W.P. and tiles T, both may be readily adhesively or otherwise (e.g., stapled) to an underlying support wall.

Referring now to FIG. 3, a cross-section on an enlarged scale, of a stiff fabric composite C according to a first embodiment of the present invention is illustrated and includes a warp-knit, weft-inserted fabric 18 looking in the weft direction, and a substrate 22 and which may have a foam backing 23 (FIG. 16). The warp-knit, weft-inserted fabric 18 includes weft or filling yarns 20 overlying substrate 22. The weft yarns may be formed of any suitable material, although preferably a thermoplastic material, such as polyester is used. Also desirable for decorative effects is a rayon filling. For decorative fabrics, such as, for example, as is used conventionally in antique satin draperies, the yarns may be provided in a relatively high-density configuration, on the order of about 40–50 single picks per inch. It is to be understood that any stitch-through warp-knit fabric design can be used in a very wide range of patterns and densities, as is done conventionally with any "soft" drapery fabric. Also, any woven fabric may be used in lieu of the warp-knit, weft-inserted fabric 18.

The weft or filling yarns 20 are held to the fabric by stitch yarns 24, including stitch loops 26 on the technical face of substrate 22. The stitch underlap 28 extends over weft yarns 20 binding the latter to the fabric. It will be appreciated that one or more weft yarns, depending upon the effect desired, may be disposed under each underlap depending upon the aesthetic effect desired. Any type of stitch may be used in the present invention, such as tricot or satin stitches, as disclosed in U.S. Pat. No. 4,608,290 to Schnegg. The warp stitching yarns 24 may be formed of any conventional material but are preferably formed of a synthetic thermoplastic material such as polyester.

It will be appreciated that laid-in warp yarns may likewise be employed in fabric 18. Thus, one or more laid-in warp yarns may be provided between adjacent stitch wales or between alternate stitch wales and may be laid-in on top of such stitch wales. The warp yarns, where used, may all overlie or underlie or alternately overlie and underlie the weft yarns 20. In either case, the stitching yarns ultimately connect the laid-in warp yarns, where used, and the weft yarns in the fabric.

The substrate 22 may be formed of a blend or a single kind of thermally formable or thermobondable synthetic fibers. For example, a mixture of polyester fibers or two different thermoplastic fibers, one having a lower melting temperature than the other fiber, may be employed. First and second different fibers are illustrated in FIG. 3 by the heavy and light lines 30 and 32, respectively, the first fibers 30 having the lower melting temperature and the second fibers 32 having the higher melting temperature. The fibers may be initially in layered form and needle-punched to intermingle the fibers substantially as illustrated, or two discrete layers of different type fibers may be employed, preferably with the fibers having the lower melting temperature in registration with the weft yarns on the technical back of the fabric. As indicated previously, the substrate may be formed by any of the methods described and illustrated in the above-identified U.S. Pat. Nos. 4,818,586; 4,424,250 and 4,199,635.

In order to form the composite 18 of the present invention, reference is made to FIG. 4, which illustrates a warp-knit, weft-insertion knitting machine, generally designated 36. A single substrate feed is illustrated and comprises a substrate 22 previously formed, for example, in accordance with any one of the three above-mentioned patents, and wound about a reel 38. Warp yarns 40 are illustrated for laying in with the weft yarns, although the warp yarns may or may not be used, depending upon the type and nature of the fabric desired. It is desirable to have the fifth bar 52 in place, even if no warp yarn is laid in, as a means of holding the substrate down when the needles rise, thus preventing disruption of the stitch-forming process, especially when a new roll of substrate is introduced to the needle bar. Weft yarns 20 of the same or various types are fed from cones 41 to the knitting area, generally designated 42, while the warp knitting yarns 44 are fed via guide bars 46 to the knitting area 42. The resulting fabric composite 18 manufactured by the knitting machine 36 is illustrated in FIG. 3. If a relatively thick substrate is used, it may be desirable to install temple rollers with extra long studs to hold the substrate firmly in the cross-machine direction, as will be appreciated by those of ordinary skill in the art.

Further processing of the fabric composite 18 to provide it with the requisite stiffness is accomplished by feeding the resulting fabric to a tenter frame 48 where the fabric is tensioned in its width direction. The fabric is then advanced into an oven 50 where heat is applied to the fabric. For example, oven 50 provides a sufficiently high temperature such that the melting temperature of the first fibers 30 in substrate 22 is exceeded. However, the temperature in the oven does not reach the melting temperature of the second fibers 32 of substrate 22. In this manner, at least some of the first fibers 30 are melted when the fabric is passed through oven 50. Consequently, by melting some of the first fibers 30, the plastic material of those fibers fuses with the second fibers 32. Prior to advancing the fabric composite 18 into the oven, the fabric may be sprayed with or dipped in a solution containing a resin/catalyst system and/or fluorocarbon polymer to reduce shrinkage or add soil resistance properties and is then dried and heated to a temperature sufficient to cause melting of the first fiber and not of the second fiber all in one pass down the oven. A flame retardant finish may be added at the same time. This is an advantage because the heat stiffening of the fibers occurs at the same time as any added chemical finish(es) are cured. Therefore, one or more additional passes through the oven (tenter frame) is eliminated. The fusing of fibers 30 in the fabric 18 provides a predetermined stiffness to the fabric, depending upon the density of the first fibers 30 in the substrate. Substrate manufacturers may in some cases prefer to use only one kind of fibers, with similar results. The fabric composite of the present invention subsequent to fusing the first fibers 30 is illustrated in FIG. 5. It is noted there that the plastic material of the first two fibers has fused to the second fibers 32. Upon removal of the fabric from the oven, the fabric is cooled and ready for use, for example, by cutting it into elongated strips to form the slats 16 of the vertical blind 10 illustrated in FIG. 1 or into panels, large or small, as illustrated in FIGS. 2 and 2A. As will be appreciated, the fabric can be set in non-planar configurations, as desired, by heating in a suitable mold.

Importantly, and according to the present invention, a degree of stiffness is provided the fabric such that the fabric will remain self-supporting and substantially rigid when subjected to elevated temperatures and/or humidity, for example, those temperatures and/or humidities as may be typically encountered in the window treatment, wall panels, environment, etc. In order to provide a measure of the degree of stiffness obtained by the fabric of the present invention, a simple test may be performed on the fabric. The fabric emanating from the stitching machine 36 prior to being placed on the tentering frame and advanced into the oven, of course, has substantial flexibility and virtually no stiffness or capacity to maintain a predetermined shape. However, the warp-knit, weft-inserted fabric with substrate of the present invention after passing through the oven and being cooled, or a comparable woven fabric according to this invention, has a degree of stiffness which can be measured by forming a piece of fabric in a 3.5 inch (about 90 mm) width of approximately 7 inches (about 180 mm) in length and clamping the fabric piece in horizontal cantilevered fashion such that 5 inches (about 130 mm) of the fabric hangs free from the clamping edge. After waiting approximately 30 seconds, it has been found that the finished woven or knitted fabric, in accordance with the present invention, has a stiffness such that the distal end of the cantilevered fabric obtains a droop from the horizontal of no more than about 2 inches (about 50 mm). This has been found satisfactory for many applications, including for use as slats in a vertical blind. It will be appreciated that while the slats are about 3.5 inches wide, the above-described stiffness test may be used for fabric used in any configuration or dimension.

In another preferred embodiment hereof, the substrate may be formed of homogenous fibers, i.e., fibers of the same size, material type and generally non-distinguishable one from the other. Thus, when the fabric including a substrate of this type is heated in the oven, the web of fibers bonds together by fusing and the substrate stiffens the resulting fabric to the required degree of stiffness, as previously mentioned. With a homogenous substrate, more precise temperature and dwell times in the oven are necessary. In this manner, however, melting of some of the fibers but not all is accomplished and, of those fibers melted, not the entirety of each such fiber is melted. That is, it is only necessary to melt portions of the fibers, not necessarily all of the fibers or the entirety of each fiber.

Figure 6:
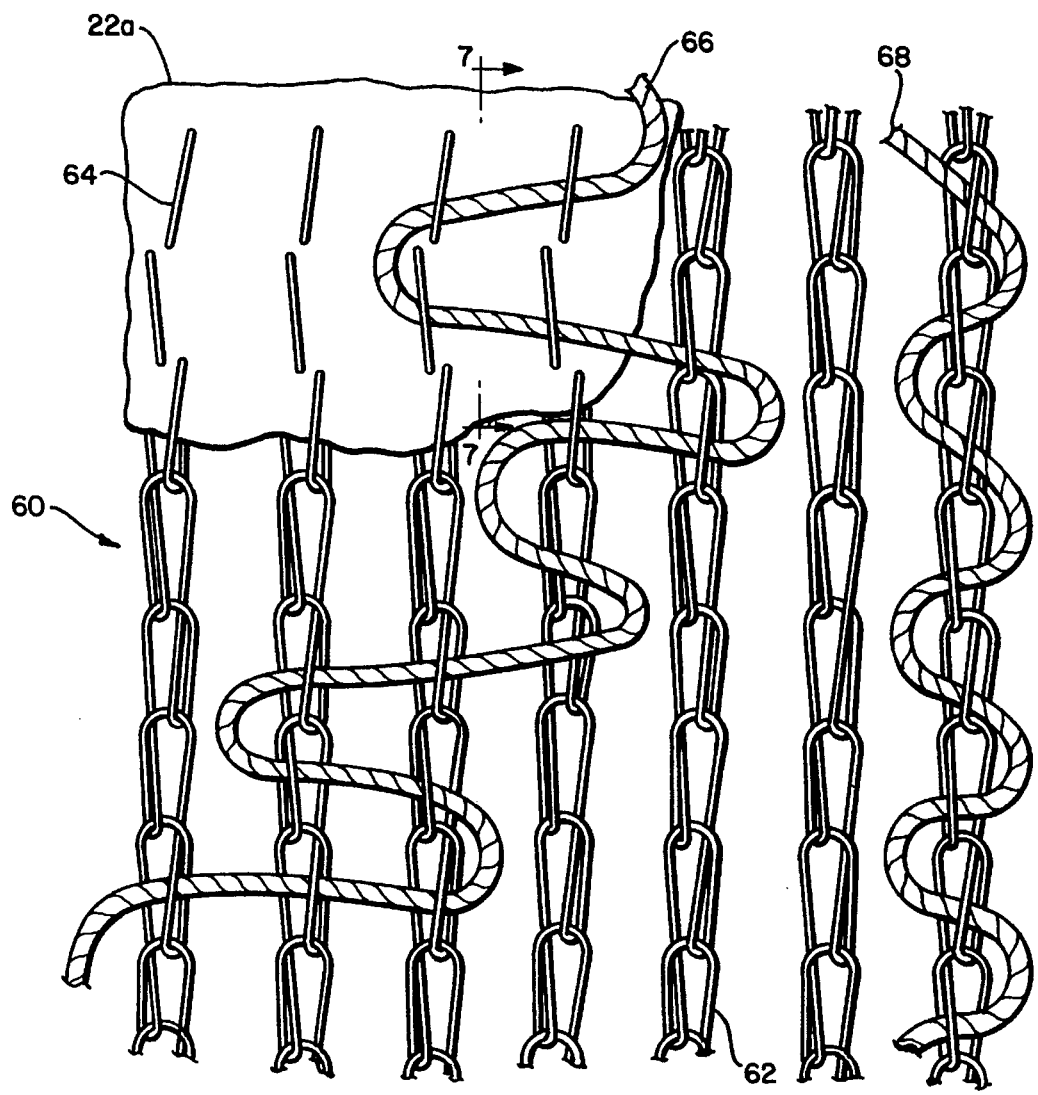
FIG. 6 is an enlarged plan view with parts broken out for ease of illustration of a warp-knit fabric constructed in accordance with the present invention.
Figure 7:
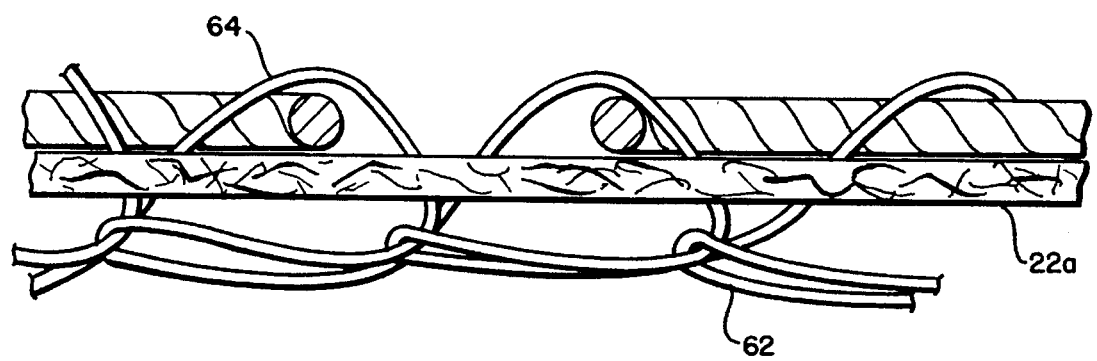
FIG. 7 is an enlarged cross-sectional view thereof taken generally about on line 7—7 in FIG. 6.

With reference to the warp-knit fabrics illustrated in FIGS. 6–11, which do not have weft-insertion, the foregoing description of the various features of the substrate, including the types of materials and characteristics are applicable to the following described warp-knit fabrics. Referring particularly now to FIG. 6, there is illustrated a warp-knit fabric, generally designated 60, comprised of a substrate 22a in which the warp yarns may comprise conventional chain stitches 62. In FIG. 6, the fabric is illustrated as viewed from the technical back, with only the underlaps 64 of the chain stitches 62 being exposed to view through the technical back. The apparatus illustrated in FIG. 4, of course, may be used to construct the fabric 60, for example, without the weft insertion or warp laid-in yarns, as illustrated in that drawing figure. Mali-type, Arachne, Tricot, or Raschel warp-type knitting machines may be used to form the fabric. Thus, after the fabric is formed by stitching the warp yarns through the substrate 22a, the fabric, similarly as illustrated in FIG. 4, is laid on the tenter frame 48 and passed to the oven 50, where the fabric is heated and the fibers interact as previously described to form a stiffened fabric.

In fabrics of this type, the patterning may be provided by the movement of the stitching bars. Alternatively, laid in warp yarns 66 and 68 may be employed to achieve a patterning effect. Warp yarns 66, as illustrated, may extend between the various stitch wales and in different stitch courses. The laid-in warp yarn 68, for example, lies sinuously in a single stitch wale. It will be appreciated that the stitching secures the laid-in warp yarns to the fabric.

Referring now to the fabric illustrated in FIG. 8 and 9, again there is illustrated a warp-knit fabric having a substrate 22b similarly as previously described. Here, however, the stitch pattern is of a zigzag type. That is, the underlaps 64b of the stitches extend diagonally from one stitch wale to the next and then reverse their direction to achieve a zigzag pattern over a plurality of stitch wales and courses.

Figure 10:
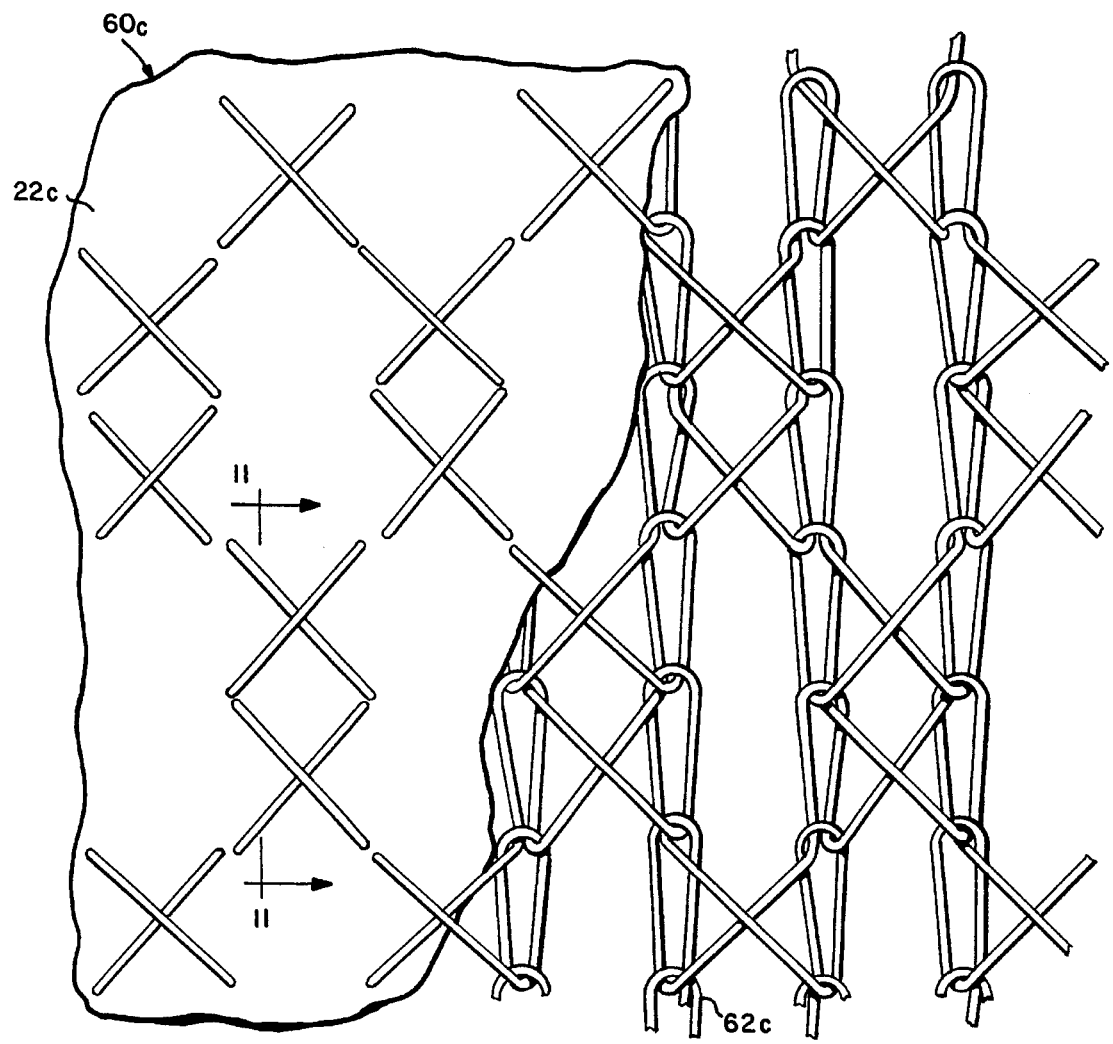
FIG. 10 is a view similar to FIG. 6 illustrating a still further warp-knit stitch pattern.
Figure 11:
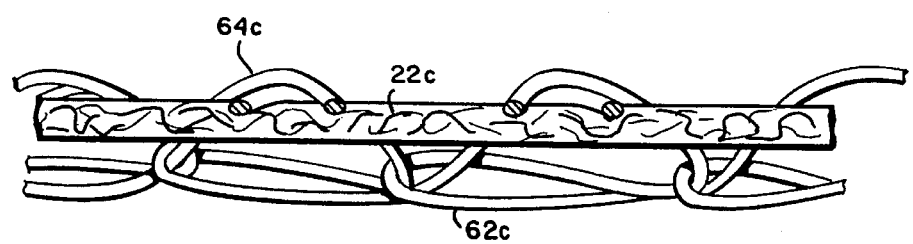
FIG. 11 is a cross-sectional view thereof taken generally about on line 11—11 in FIG. 10.

In FIGS. 10 and 11, there is illustrated a still further form of a warp-knit fabric 60c incorporating the principles of the present invention. In this form, it will be appreciated that the patterning in the fabric is achieved solely by the stitch pattern provided by stitches 62c. As viewed from the technical back, the stitch pattern comprises a plurality of crossed underlaps spaced from one another in both the machine and cross-machine directions.

Referring now to FIGS. 12 and 13, there is illustrated a warp-knit, weft-inserted fabric generally designated 70 comprised of a substrate 22d with laid-in weft yarns 72, stitch yarns 74 and a number of laid-in warp yarns 76. The warp and weft yarns 76 and 72, respectively, and the underlaps of the stitch pattern lie on the technical back of the fabric. It will be appreciated that various types of warp yarns may be laid in at various locations to achieve desired decorative effects.

Referring now to FIG. 15, there is illustrated a cross-section on an enlarged scale of a stiff fabric composite according to another embodiment of the present invention. The fabric composite is generally designated 120 and includes a woven fabric 122 underlying a substrate 124. The woven fabric 122 may have a pick level between about 6 PPI (about 24 picks per 10 cm) and about 55 PPI (about 217 per 10 cm). The warp and weft yarns 126 and 128 of the woven fabric 122 may be formed of any suitable material. For example, the warp may comprise natural fibers or synthetic fibers, such as polyester or polypropylene. The filling yarns may comprise any number of fibers such as rayon, cotton, polyester or acrylic in regular or novelty yarns. The woven fabric may range in weight from about 0.14 lbs/square yd. (75 gms/m$^2$) to about 0.60 lbs/square yd. (about 325 gms/m$^2$) or 0.17 lbs/lit.yd. to 0.75 lbs/lin.yd., depending on the width of the fabric, i.e., typically 45–55 inches (115–140 cm).

The substrate 124 may be of the type described above in connection with the first embodiment hereof. Two examples of the fibers for use in the substrate are given as follows. One example comprises a non-woven substrate formed of 100% polypropylene having a weight range of about 4.5 to about 9 oz/yd$^2$ (about 160 to about 310 gm/m$^2$) and being formed of staple fibers in the 3.25 to 5.5 Denier range and a staple length of about 3.25–4.5 inches (about 83 to 115 mm). Such substrate may be obtained from Spartan Technologies, Spartansburg, S.C., under the designation N470 (7.5 oz/yd$^2$, i.e., 255 gm/m$^2$). Another substrate useful in the present invention may be formed of a needled non-woven 100% polyester in a weight range of about 5–9 oz/yd$^2$ (about 170–310 gm/m$^2$) as manufactured by Foss Manufacturing, Hampton, N.H., under the designation 24-Y-4 7.5 oz/yd$^2$ (255 gm/m$^2$).

With reference to FIG. 14, the stiff fabric composite of the present invention is formed by initially adhering the non-woven substrate and the woven fabric in a manner which, when the process is completed, will assist in the bonding of the two fabrics one to the other. Particularly, the non-woven substrate 124 and woven fabric 122 are laid one over the other while passing through suitable guides 134. Preferably, the non-woven substrate is laid over the woven fabric 122, the back of which faces the substrate, so that needle punch 136 may be disposed above the overlaid fabrics, with the needles passing first through the non-woven substrate and penetrating to a limited extent the woven fabric 122. It will be appreciated, however, that, for some fabric composites, the needling may pass first through the woven fabric and then into the substrate. This depends on the type of filling yarn, e.g., heavy, sturdy novelty yarns versus straight regular yarns. Needling first through the substrate is preferred because a better bond is formed between the woven fabric and the non-woven substrate. The needle-punch machine may be any conventional type such as Model NL-21 manufactured by the Fehrer Company, Linz, Austria. Thus, needles 137 of the needle punch 136 in the course of their penetration of the non-woven substrate displace the thermoplastic fibers into and about the woven fabric 122, as illustrated in FIG. 14. Only a small percentage of the fibers of the non-woven substrate 124 pass entirely through the woven fabric 122 to terminate in the face of the fabric, as illustrated in FIG. 14. The penetration depth of the needles can vary between 5–10 mm, depending upon the thickness of the woven fabric and the desirable amount of substrate fibers on the face of the woven fabric for additional bonding between the substrate and the woven fabric after thermofusing. The needle penetration can vary between 600 to 1200 penetrations/in. (120 to 240 per cm$^2$), depending upon the density of the woven fabric and the type of needle used without significantly weakening the warp and/or the filling yarns of the woven fabric or affect alteration of the face of the finishing fabric composite. The needle used in the process may be the "Foster Formed Barb" HDB (high density barb) needled in 36, 40 and 42 gauge sizes or RBA 40 gauge needles. Consequently, by needle-punching the fabrics, the woven fabric and non-woven substrates are initially adhered one to the other and form a bond which will be consolidated during the thermofusing process.

Further processing of the composite fabric to provide it with the requisite stiffness is provided by feeding the fabric composite to a tenter frame 138 where the fabric is tensioned in its width direction. The fabric is then advanced into an oven 140 where heat is applied to the fabric, similarly as in the first embodiment. For example, oven 140 provides a sufficiently high temperature such that the melting temperature of the first fibers 130 in substrate 122 is exceeded. The oven temperature may range from about 310° F. to about 370° F., depending on the type of substrate used and whether added treatments, such as resin or fluorocarbon topical treatments, are used. Fabric composite speeds through the oven may range between about 20–30 yards per minute (about 18–27 m/min.). Heated steam cans can be used an the exit end of the tenter frame to further enhance the smoothness of the face and back of the woven fabric and the fused substrate. However, the temperature in the oven does not reach the melting temperature of the second fibers 132 of substrate 124. In this manner, only the first fibers 130 are melted when the fabric is passed through oven 140. Consequently, by melting first fibers 130, the plastic material of those fibers fuses with the second fibers 132. The fibers 130 interspersed in woven fabric 122, as well as those few fibers 130 which have passed through woven fabric 122 to its opposite face are fused to the fabric 122. This provides added strength to the mechanical bond between the substrate 124 and woven fabric 122 afforded by the needling. The fusing of fibers 130 in the substrate 124 and to the woven fabric 122 thus provides a predetermined stiffness to the fabric composite, depending upon the density of the first fibers 130 in the substrate and, to a limited extent, their adherence in the woven fabric. Dwell time in the oven may be on the order of 45–90 seconds. Substrate manufacturers may in some cases prefer to use only one kind of fibers, with similar results.

The fabric composite of the present invention subsequent to fusing the first fibers 130 is illustrated in FIG. 15. It is noted there that the thermoplastic fibers 130 have fused to the second fibers 132. Upon removal of the fabric from the oven, the fabric is cooled and ready for use, for example, by cutting it to elongated strips to form the slats 16 of the vertical blind 10 illustrated in FIG. 1 or the panels W.P. or tiles T. The stiffened composite may also be pleated into any size pleat on a pleating machine, not shown, with the pleats being stiff and having good retention. The degree of pleat retention and pleat springiness can be varied by the degree of softening/fusing of the non-woven substrate and the weight of the substrate. As will be appreciated, the fabric can be set in other non-planar configurations, as desired, by heating in a suitable mold.

Importantly, and according to the present invention, a degree of stiffness is provided the fabric composite of this embodiment, similarly as in the first embodiment, such that it will remain self-supporting and substantially rigid when subjected to elevated temperatures and/or humidity, for example, those temperatures and/or humidities as may be typically encountered in the window treatment environment. Using a similar sized piece of the composite as in the first embodiment, the composite piece is disposed in horizontal cantilevered fashion such that about 5 inches (about 130 mm) of the fabric hangs free from the clamping edge. After waiting approximately 30 seconds, it has been found that the fabric, in accordance with this embodiment, has a stiffness such that the distal end of the cantilevered fabric composite obtains a droop from the horizontal from about 0 inches (0 mm) to about 2.0 inches (about 50 mm) depending on the types of substrate and woven fabric used. This has been found satisfactory for many applications, including for use as slats in a vertical blind, wall panels, tiles and the like. It will be appreciated that while the slats are about 3.5 inches (about 90 mm) wide, the above-described stiffness test may be used for fabric used in any configuration or dimension.

Additional substrate layers may be included in any one of the embodiments hereof, as well to add to the thermal insulating character of the fabric or to add opacity or black-out effects. The composite fabric is also moldable if different shapes should become of interest to the market.

In another preferred embodiment of the fabric composite of FIGS. 14–15, the substrate may be formed of homogenous fibers, i.e., fibers of the same size, material type and generally non-distinguishable one from the other, similarly as in the prior embodiment of FIGS. 3–5. With a homogenous substrate, more precise temperature and dwell times in the oven are necessary. In this manner, however, melting of some of the fibers but not all is accomplished and, of those fibers melted, not necessarily the entirety of each such fiber is melted. That is, it is only necessary to melt portions of the fibers, not necessarily all of the fibers or the entirety of each fiber.

The following charts identify a number of fabric styles which have been tested for stiffness using the droop test set forth previously in the application. Particularly, pieces of the identified fabrics 3.5 inches wide (about 90 mm) are cantilevered five inches (about 130 mm). After thirty seconds, the droop at the distal end was measured. Tests were run for each fabric style to determine its droop. For the fabrics of the second chart, two tests were run for each fabric style with the fabric face up (knitted or woven design up) and fabric face down (knitted or woven design down).

One of the benefits of this composite fabric resides in the ability to both cure the foam and fuse the substrate simultaneously as the composite fabric is heated in a single pass through a heater such as an oven. That is, a separate pass through a heater, in order to cure the foam, is not necessary in addition to heating the substrate to fuse the fibers.

| Fabric Style Name | Face Fabric Weight Gms./Sq. Meter | Face Fabric Construction | Substrate/ Backing Fabric Weight Gms./Sq. Meter | Droop of Laminate from Horizontal (in cm) |
|---|---|---|---|---|
| Talbott | 265 | 100% Polyester | 255 | −.32 |
| Santorini | 160 | 71% Rayon 29% Polyester | 255 | −.32 |
| Applauso | 170 | 74% Rayon 26% Polyester | 255 | −.48 |
| Supreme | 196 | 69% Rayon 31% Acetate | 255 | −.95 |
| Lyla Lace | 65 | 100% Polyester | 136 | −.95 |
| Manson | 98 | 100% Polyester | 112 + 24 | −4.12 |
| Milano | 98 | 100% Polyester | 112 + 24 | −4.76 |
| Strata | 98 | 100% Polyester | 112 + 24 | −2.86 |
| Warp Print I | 135 | 100% Polyester | 255 | −.16 |
| Warp Print II | 135 | 100% Polyester | 112 + 24 | 2.54 |
| Talbott | 265 | 100% Polyester | 112 + 24 | 2.86 |

| Fabric Style Name | Face Fabric Weight Gms./Sq. Meter | Face Fabric Construction | Substrate/ Backing Fabric Weight Gms./Sq. Meter | Total Face & Backing Fabric Weight Cms./Sq. Meter | Droop (Face Up) | Droop (Face Down) |
|---|---|---|---|---|---|---|
| Siera (Woven) | 190 | 33% Polyester 67% Rayon | 225 | 445 | −1.91 cm | −.79 cm |
| Siera-Pink (Woven) | 190 | 33% Rayon 67% Polyester | 255 | 445 | −.95 cm | 0.0 cm |
| Essential (Woven) | 190 | 91% Polyester 9% Rayon | 255 | 445 | −1.27 cm | −.64 cm |
| Montana (Knitted) | 120 | 50% Polyester 42% Cotton 7% Rayon 1% Acrylic | 205 | 325 | −1.27 cm | −1.59 cm |
| Dover (Woven) | 255 | 59% Polyester 37% Rayon 3% Cotton 1% Nylon | 255 | 510 | −2.22 cm | −1.43 cm |
| Jeweltex (Woven) | 160 | 41% Polyester 40% Rayon 17% Cotton 1% Acrylic 1% Nylon | 255 | 415 | −1.43 cm | 0.0 cm |
| Alamos-White (Woven) | 190 | 34% Polyester 56% Rayon 10% Acrylic | 255 | 445 | −1.91 cm. | −.79 cm |

As a check that the droop of the fabric according to the above tests is not time dependent, the Montana face up fabric was measured after twenty-four hours in the droop test assembly. The measured droop after 24 hours for the face up fabric was 5/8 inch, an insignificant change from the 30 second test.

Turning now to FIG. 16, there is illustrated a composite fabric C (identical to the fabric of FIG. 3 hereof) and having a foam backing 23. Foam backing 23 may comprise an acrylic latex foam such as, for example, described and illustrated in U.S. Pat. No. 4,362,774. Foam 23 is cured directly on the side of the substrate opposite the fabric 18.

With reference to FIG. 17, and once the fabric 18 and substrate 22 are formed, the fabric and substrate are passed over a coating table set-up 25, with the fabric 18 facing downwardly. The foamable or foamed composition, preferably an acrylic latex foam, may then be disposed in fluid form onto the back of the composite, i.e., on the substrate 22. Short fibers of cotton or similar flock material may be sifted onto the foam as set forth in prior U.S. Pat. No. 4,362,774. The composite fabric, substrate and latex foam are then passed through a heater, i.e., an oven 27. During the heat treatment, the substrate is fused simultaneously as the foam is cured, i.e., the oven provides a sufficiently high temperature such that the melting temperature of the first fibers 30 in substrate 22 is exceeded, but a sufficiently low temperature such that the melting temperature of the second fibers 32 of substrate 22 is not exceeded, and a temperature sufficient to cure the foam.

With the application of the foam to the underside of the fabric, a composite C, as illustrated in FIG. 18, having a softer, smoother hand and greater eye appeal is provided. The fusible substrate, when heated, would typically provide a stiff, rough surface due to melting and stiffening of the fibers. By applying the acrylic latex foam to the back of the composite, with or without flocking, a smooth, soft surface, pleasing to the touch, is afforded. The acrylic latex foam also increases opacity by reducing the amount of light that can pass through the composite while affording some additional stiffness to the fabric.

It will be appreciated that warp knit fabrics without weft insertion and with or without warp laid-in yarns may be utilized in the composite fabric of the present invention. Warp yarns, where used, may be employed to achieve patterning effects with the stitching securing the laid-in warp yarns to the fabric. Various types of stitching, for example, zigzag stitching, may be employed. Additionally, patterning effects in the fabric may be achieved solely by stitch patterns.

It will also be appreciated that the composite C hereof may desirably be formed of a combination of a woven fabric, a substrate and a foam backing. For example, with reference to FIG. 19, there is illustrated a cross-section of a stiff fabric composite identically as in FIG. 15 and with a foam backing applied thereto. The fabric composite 120, of this embodiment, thus includes a woven fabric 122 underlying a substrate 124 and a foam backing 125.

Figure 19:
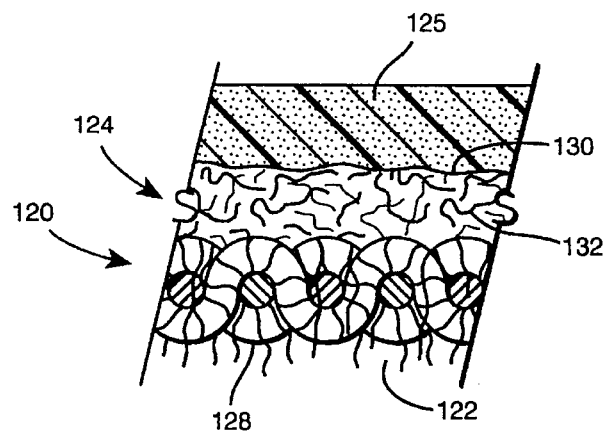
FIG. 19 is a fragmentary enlarged view of a woven, fabric composite constructed in accordance with a further embodiment of the invention.
Figure 20:
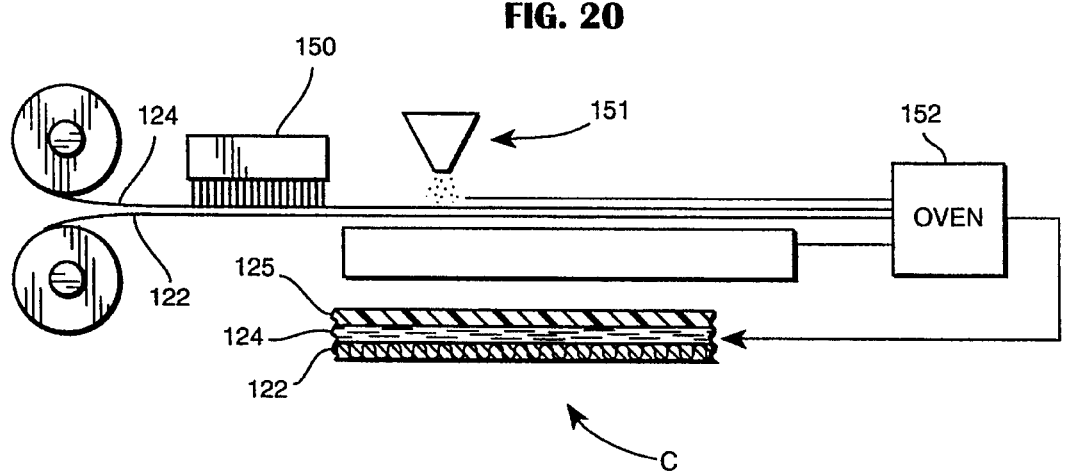
FIG. 20 is a schematic illustration of a method of forming a stiff fabric composite with a foam backing in accordance with the embodiment of FIG. 19.

With reference to FIG. 19, the stiff fabric composite is formed by initially adhering the non-woven substrate 124 and the woven fabric 122 at needle loom 150 as previously described with respect to FIG. 15 and a foam backing 125 is applied. Thus, the needle-punched laminate of the non-woven fabric 122 and substrate 124 is passed over a coating table as illustrated in FIG. 20 for application of the acrylic latex foam as at 151. Particularly, a wet foam comprised of an acrylic polymer, resin cross-linking agent, foaming agent, foam stabilizer, filler material and pigment such as described in U.S. Pat. No. 4,362,774 is applied to the substrate. Short fiber cotton flocking may likewise be applied to the wet foam. The composite of the fabric, substrate and foam is then advanced into an oven 152 where heat is applied. Oven 152 provides a sufficiently high temperature such that the melting temperature of the first fibers 130 in substrate 124 is exceeded. The oven temperature may range from about 310° F. to about 370° F., depending on the type of substrate used and whether added treatments, such as resin or fluorocarbon topical treatments, are used. Fabric composite speeds through the oven may range between about 20–35 yards per minute (about 18–32 m/min.). Heated steam cans can be used at the exit end of the oven frame to further enhance the smoothness of the face. However, the temperature in the oven does not reach the melting temperature of the second fibers 132 of substrate 124. In this manner, only the first fibers 130 are melted when the composite is passed through oven 152. Consequently, by melting first fibers 130, the plastic material of those fibers fuses with the second fibers 132. The fibers 130 interspersed in woven fabric 122, as well as those few fibers 130 which have passed through woven fabric 122 to its opposite face are fused to the fabric 122. This provides added strength to the mechanical bond between the substrate 124 and woven fabric 122 afforded by the needling. The fusing of fibers 130 in the substrate 124 and to the woven fabric 22 thus provides a predetermined stiffness to the fabric composite, depending upon the density of the first fibers 130 in the substrate and, to a limited extent, their adherence in the woven fabric. Dwell time in the oven may be on the order of 20–60 seconds. Substrate manufacturers may in some cases prefer to use only one kind of fibers, with similar results.

Simultaneously with the fusing of the fibers 130 in substrate 124, the acrylic latex foam is cured in the oven 152. Consequently, a separate pass-through of the composite through a separate heater to cure the foam is eliminated. Moreover, curing of the foam provides an additional degree of stiffness to the fabric composite, as well as a smoother hand with more eye appeal to the back of the product.

Upon removal of the composite from the oven, it is cooled and ready for use, for example, by cutting it into elongated strips to form the slats 16 of the vertical blind 10 illustrated in FIG. 1 or the panels W.P. or tiles T. The stiffened composite may also be pleated into any size pleat on a pleating machine, not shown, with the pleats being stiff and having good form retention. The degree of pleat retention and pleat springiness can be varied by the degree of softening/fusing of the non-woven substrate, the weight of the substrate and the thickness of the foam backing. As will be appreciated, the fabric and foam backing can be set in other non-planar configurations, as desired, by heating in a suitable mold.

It will be appreciated that in the embodiments hereof of FIGS. 1–20, the composite fabric is passed through an oven at a temperature sufficient to melt at least some of the fibers of the substrate, thereby fusing the fibers of the substrate one to the other affording a stiffness to the fabric. By using especially the warp-knit or warp-knit, weft-inserted insertion technique, various decorative patterns may be formulated and the resulting fabric stiffened to form the highly desirable stiff fabric composite hereof with a foam backing.

Further, when the thermoplastic fibers of the substrate are melted using the foregoing described process illustrated in FIG. 20, certain of those fibers at the interface of the substrate and the woven or knitted material fuse with the woven or knitted material. Such fusing at the interface, however, does not substantially contribute to the bonding of the substrate and woven or knitted material to one another, it being appreciated that the knitted material is mechanically bonded in the substrate by the stitch through threads and that the woven material is mechanically bonded to the substrate by needle-punching certain of the substrate fibers into the woven material.

However, when the fusible substrate described above is brought together with a woven fabric and passed through a heat transfer print machine containing heated rolls and a blanket, the fiber having the lower melting temperature becomes tacky and bonds the substrate to the woven fabric. At the same time, the substrate is fused, producing the stiffened composite. Consequently, it will be appreciated that the composite hereof comprising the fabric, substrate and foam backing, may be formed by first fusing the substrate and the fabric to one another in a separate heat transfer print machine with the foam being subsequently applied and cured in a separate heating oven.

Additional ways of adhering the substrate and fabric to one another may also be used in contrast to the previously described needle-punching for woven fabrics or the stitch-through adherence of the warp-knit or weft-insertion fabrics. For example, a partially fused substrate, i.e., one having only some of the fibers fused, while other fibers remain unfused, may be treated by sifting a powdered adhesive, such as a polyester adhesive, onto the substrate surface. The treated substrate is then passed through an oven heated by hot air or infrared energy to melt the powdered adhesive. At the exit of the oven, the substrate is brought together with a woven fabric and the composite squeezed through a nip roll arrangement to provide intimate contact between the substrate and woven fabric with the melted powdered adhesive on the substrate face forming a bond between the substrate and fabric. Advantageously, the fabric is not exposed to temperatures greater than 160° F. and this results in minimal, if any, color change or fabric degradation due to higher temperatures necessary to cure the foam backing. In the alternative, the foam backing may be applied subsequent to the adherence of the substrate and fabric to one another.

Figure 21:
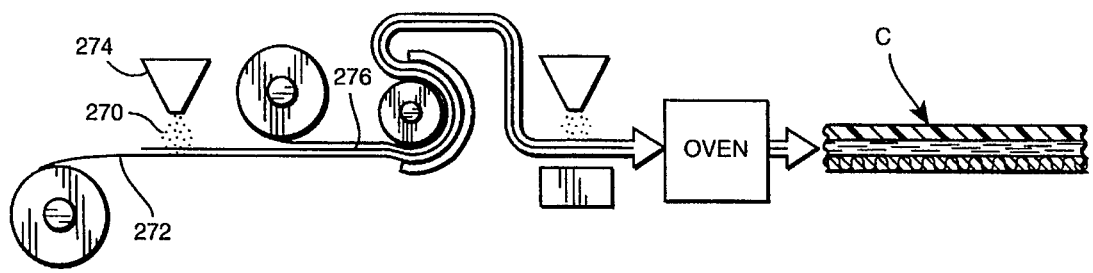
FIGS. 21–26 are further schematic illustrations of respective methods for forming a stiff fabric composite according to a preferred embodiment of this invention.

Referring to FIG. 21, there is illustrated a further method of securing the fabric and substrate to one another. In this embodiment, a hot-melt adhesive 270, such as Eastobond A-528, which is a-polyethylene-based polymer, supplied by Eastman Corporation, may be applied to the back of the fabric 272 using a hot-melt extruder 274. The treated fabric is laminated to a fusible substrate 276. The substrate and fabric are then passed through a heating device, such as a heat transfer print machine which contains heated rolls and a blanket, whereby the substrate and fabric are bonded together and the substrate is fused at the same time to produce a stiffened composite of fabric and substrate. If a foam backing is desired, as illustrated in FIG. 21 as part of the final product, the acrylic latex foam may be applied to the back of the substrate and the composite foam, substrate and fabric passed through an oven, similarly as disclosed above in connection with FIG. 20. Thus, the hot-melt adhesive, the fusing of certain of the fibers in the substrate, and the application of the foam backing impart a stiffness to the final composite C.

Figure 22:
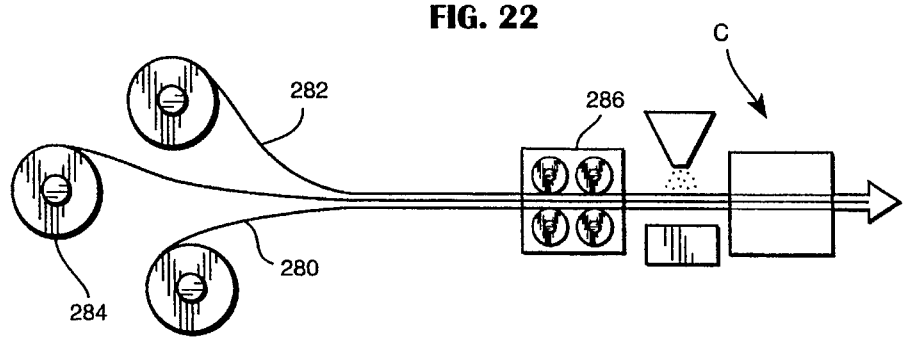

In another embodiment of the present invention illustrated in FIG. 22, the fabric 280 and substrate 282 may be laminated by sandwiching a fusible net 284 therebetween. Particularly, the fusible net may be a material sold under the tradename Delnet, manufactured by Applied Extrusion Tech, Inc. The composite of the fabric, substrate and net is passed through a heating device such as a heat transfer print machine 286 containing heated rolls and a blanket. In this manner, the fabric and substrate are bonded to one another by the fusible net (the fusible net essentially becomes an adhesive bonding the fabric and substrate to one another), while simultaneously the substrate is fused to produce a stiffened composite C. The foam backing may be later applied to the substrate to form the final composite C of a fabric, substrate and foam backing, as previously described, particularly with respect to FIG. 20.

Figure 23:
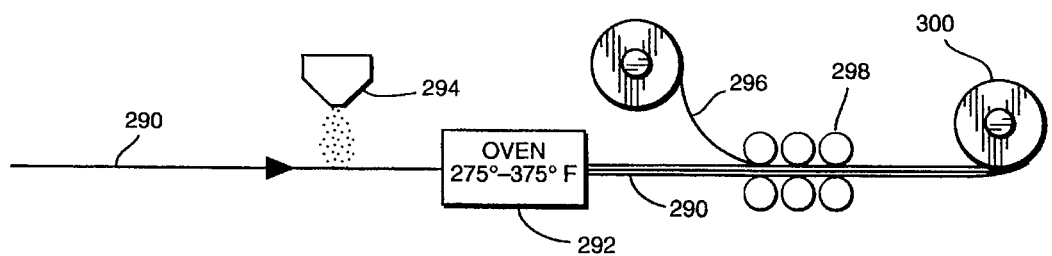

Referring now to FIG. 23, there is illustrated a different laminating technique for use with a non-fusible substrate, for example, a Reemay S/2470 or Freudenberg LDH-1025C. In this embodiment, the substrate 290 is positioned adjacent the entry of a gas fired or infrared heater 292. Substrate 290 is passed below a hopper 294 containing ground polyester powder. The polyester powder is applied to the substrate passing underneath the hopper 294, for example, at a rate of 10–20 gms/yd. The powder is then heated into a molten state inside heater 292 at temperatures ranging between 220°–375° F., the substrate being passed through the oven at approximately 20–35 yds/min. After the substrate 290 passes through the oven 292, a fabric 296 is positioned on top of the molten polyester powder and the substrate. This laminate of fabric, molten polyester powder and substrate is then passed through the successive nips of a set of water-cooled rollers to press the components together and cool the powder to achieve a bond between the fabric and the substrate. The laminate is then exposed to air-cooling for a short distance of travel and may either be rolled up as illustrated at 300 or a foam backing may be applied similarly as previously described.

A principal advantage of this embodiment illustrated in FIG. 23 is that the fabric may be made from fibers having heat-sensitive colors. Because the fabric is not placed in the oven, very little, if any, color degradation occurs. The fabric is exposed only to the residual heat of the existing molten polyester powder at approximately 160°–200° F.

Figure 24:
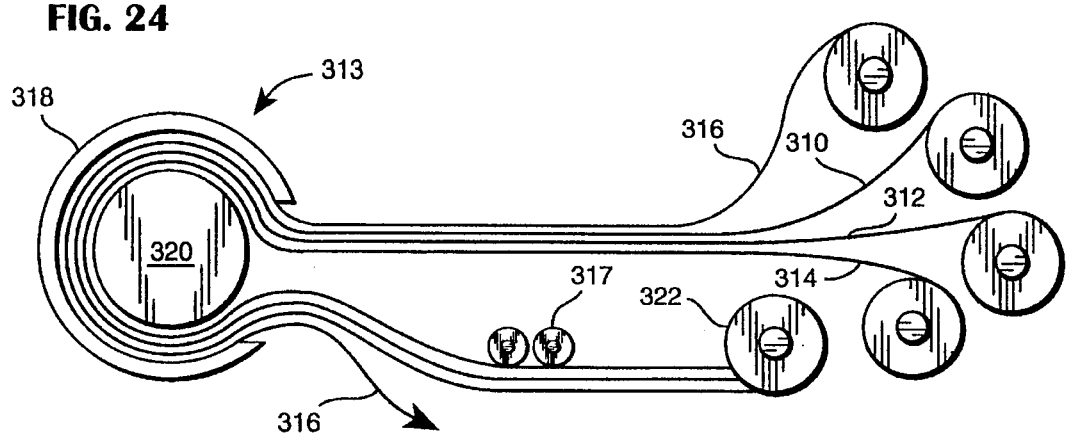

In FIG. 24, there is illustrated another preferred form of a manufacturing process to form a stiff composite fabric according to the present invention and particularly one made from a synthetic fiber. There are certain synthetic fabric styles, for example, Supreme Satin, which consist of acetate and rayon yarns which cannot be heat or chemically finished without considerable change of color and physical degradation. Moreover, that particular fabric cannot be finished with the above-described needle-punching and thermofusing technique, as such process degrades the lustrous satin-look face of the fabric. To form this desirable fabric into a stiff composite as illustrated in FIG. 24, the various elements of the lamination are arranged for passage through a heat-transfer/warp print machine. The Supreme Satin fabric 310 and a non-woven substrate, for example, the Foss substrate previously described, are taken from rolls and passed through a heat-transfer/warp print machine, generally designated 313. The Foss substrate used is the same substrate used in the needle-punch process previously described. However, a very thin spunbonded polyester 314 forms a part of the laminate as the laminate passes through the heat-transfer/warp print machine to act as a buffer between the substrate 312 and the heated drum 320 of the machine 313. The spunbonded polyester may be provided from Fibertech Industries at 0.7 ounces per square yard, it being a non-sticking material which prevents the substrate 312 from adhering to the drum 320. Thus, the order of laminate material in contact with the drum is the spunbonded polyester 314, substrate 312 and fabric 310. A thin, full-width tissue paper 316 may be disposed between the fabric and the blanket to preclude any "roughening" of the fabric surface by the blanket. As shown, tissue paper 316 is withdrawn for possible reuse, or disposal/recycling.

To obtain an acceptable degree of lamination between the substrates and the fabric, the drum temperature may be about 390°–440° F. to achieve a temperature of approximately 360°–390° F. on the face of the fabric 310. Because of the relatively high drum temperature, the spunbonded polyester 314 adheres to the substrate 312 and the final product with the polyester adhered thereto may be rolled on a roll 322 after removal of the tissue paper 316 and cooling by rolls 317. The drum speed may vary between three yds/min and eight yds/min. It will be appreciated that certain of the fibers of the substrate fuse during heating while others remain substantially unmelted to provide stiffness to the resulting composite.

Figure 25:
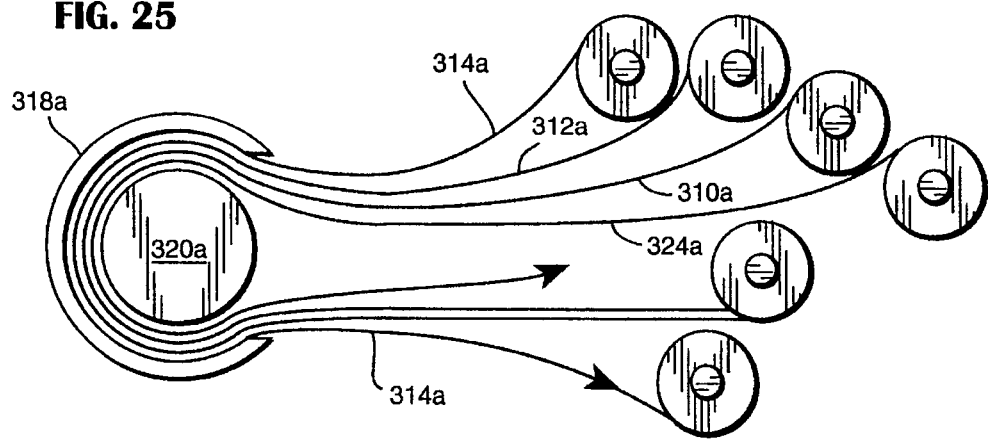

As illustrated in FIG. 25, the order of the laminates about the drum may be reversed from that disclosed in FIG. 24. Thus, as illustrated, the spunbonded polyester 314a is disposed between the blanket 318a and the substrate 312a. Underlying the substrate is the fabric 310a. In this form, with the fabric against the drum 320a, the face fabric temperature during lamination is preferably at about 360°–390° F., it being appreciated that the lower the drum temperature, the less possibility for color and fabric degradation. At such low temperatures, the substrate 314a may be removed from the finished product emerging from the heat transfer/warp print machine, the substrate 312a stabilizing the Supreme Satin fabric.

Printing may be applied to the face of the fabric. For this purpose, transfer print paper 324 may be fed into the heat transfer/warp print machine between the drum and the woven or knitted fabric. Thus, decorative designs or prints may be provided on the fabric. It will be appreciated that the principles of lamination set forth with respect to FIGS. 24 and 25 can be applied to a multiplicity of other fabrics having varying fiber contents. For example, with a 100% polyester fabric, the weight of the substrate could be lowered to between 2.8–7.0 oz/yd$^2$ while obtaining an acceptable fabric composite.

Figure 26:
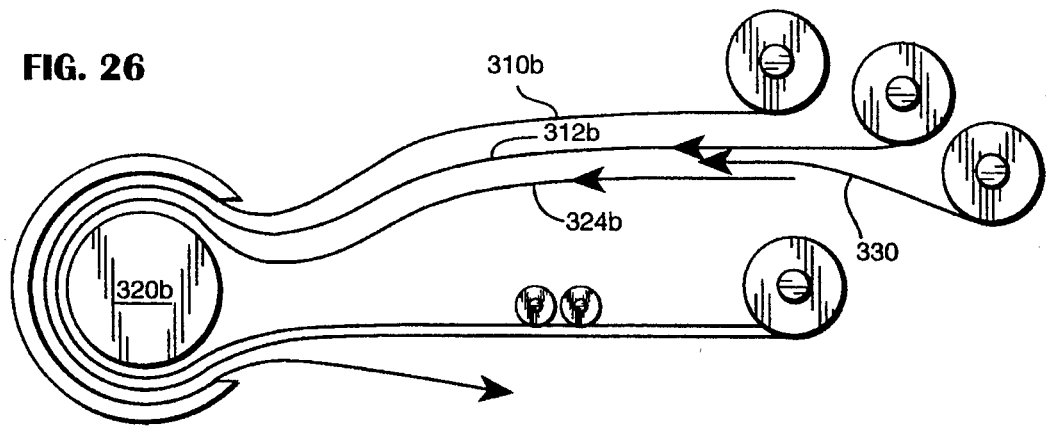

The fabric described previously can also be used to form a fabric suitable for vertical blinds from yarns directly off a warp beam used on looms. For example, the warp beam may be positioned at the entry of the warp printing/heat transfer machine and the yarns are threaded about several rolls to the entry of the machine. In this process, the substrate can vary in weight between 10 oz/yd$^2$ (about 237 g/m$^2$) and 2.8 oz/yd$^2$ (about 65 g/m$^2$) and a thin, non-woven, non-fusible substrate can be disposed underneath the yarns. For example, as illustrated in FIG. 26, a sheet of warp yarns 310b from a warp beam and the substrate 312b, together with a thin, non-woven, non-fusible substrate 330, are passed to the entry of the heat-transfer/warp machine. Transfer print paper 324b can be added between the fabric and drum to provide decorative or printed fabrics, as desired. The composite of the warp beam yarns, thermofusible substrate and non-fusible, thin, non-woven substrate are processed through the machine at temperatures varying between 370°–440° F. and speeds from 2 yds/min. (about 1.8 m/min.) to 12 yds/min. (about 11 m/min.). On passing through the machine, the yarns are pressed into the softened thermofusible substrate. Upon exiting and air-cooling, a stiff, fabric-like composite is achieved. It will be appreciated that the weight of the thermofusible substrate is varied, depending upon the number of yarn ends. The greater the number of the yarn ends or the heavier the yarn count, the heavier the weight of the substrate in order to have sufficient fusible mass to hold the yarns.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a stiff fabric having stitch through warp yarns and a substrate comprising the steps of:

on a knitting machine, (a) providing a non-woven substrate for movement in the machine direction formed of first and second different fibers with said first fibers formed of thermoplastic material having a predetermined melting temperature, and (b) stitching the warp yarns and substrate each to the other, and thereafter, heating the fabric to a temperature to fuse said first fibers with said second fibers of the substrate to provide a predetermined stiffness to the fabric while simultaneously retaining the definition of said second fibers as fibers in said fabric and with stitch underlaps and loops exposed and defined on opposite sides of the stiff fabric.

2. A method of forming a stiff fabric having stitch through warp yarns, a substrate and a foam backing comprising the steps of:

on a knitting machine, (a) providing a non-woven substrate for movement in the machine direction formed of first and second different fibers with said first fibers formed of thermoplastic material having a predetermined melting temperature, and (b) stitching the warp yarns and substrate each to the other;

applying a foamed or foamable composition of a polymeric material to one side of said substrate; and thereafter, heating the fabric, substrate and foamed or foamable composition simultaneously to a temperature to (i) fuse said first fibers with said second fibers of the substrate to provide a predetermined stiffness to the fabric while retaining the definition of said second fibers as fibers in said fabric and (ii) cure the foamed or foamable composition to form a stiff fabric composite with a foam backing.

3. A method according to claim 2 including fusing said first fibers to the warp yarns.

4. A method according to claim 2 wherein the fabric is a warp-knit, weft-inserted fabric, including the steps of, on said knitting machine, laying in weft yarns in the cross-machine direction and stitching the weft yarns and substrate each to the other.

5. A method according to claim 2 including the step of laying in warp yarns on the substrate.

6. A method of forming a stiff fabric composite comprising the steps of:

needling a non-woven substrate formed of thermoplastic fibers and a woven material one to the other;

applying a foamed or foamable composition to one side of the substrate;

heating the needled non-woven substrate, woven material and foamed or foamable composition simultaneously to a temperature to (i) fuse at least some of said fibers in said substrate and (ii) cure the foamed or foamable composition to provide a fabric composite with foam backing of predetermined thickness.

7. A method according to claim 6 including the steps of providing a non-woven substrate formed of first and second thermoplastic fibers wherein said first fiber has a melting temperature lower than the melting temperature of said second fiber and the step of heating includes melting at least some of the first fibers without substantial melting of the second fibers such that some of the first fibers are fused with the second fibers.

8. A method according to claim 6 including heating the substrate, woven material and foamed or foamable composition to a temperature to fuse at least some of said fibers in said substrate to said woven material.

9. A method of forming a stiff fabric composite comprising the steps of:

fusing only a portion of fibers of a substrate, leaving a remaining portion unfused;

applying an adhesive to a surface of the partially fused substrate;

heating the partially fused substrate with adhesive applied thereto to melt the adhesive; and thereafter adhering a fabric to the substrate with the adhesive forming a bond therebetween.

10. A method according to claim 9 including applying a foamed or foamable composition to the substrate and curing the foamed or foamable composition.

11. A method of forming a stiff fabric composite comprising the steps of:

applying an adhesive to one of a substrate having first and second thermoplastic fibers and a fabric;

laminating the substrate and the fabric to one another with the adhesive bonding the substrate and fabric to one another; and heating the laminated substrate and fabric to a predetermined temperature sufficient to melt said first fibers such that said first fibers are fused with said second fibers in the substrate to provide a composite having a predetermined stiffness, with said second fibers remaining substantially wholly unmelted during heating.

12. A method according to claim 11 including applying a foamed or foamable composition to the substrate and curing the foamed or foamable composition.

13. A method according to claim 12 including curing the foamed or foamable composition simultaneously with fusing said first fibers during heating.

14. A method of forming a stiff fabric composite comprising the steps of:

disposing a fusible material between a substrate having first and second thermoplastic fibers and a fabric; and laminating said substrate, fusible material and fabric to one another by heating said substrate, fusible material and fabric to a predetermined temperature sufficient to melt said first fibers such that said first fibers are fused with said second fibers in said substrate to provide a composite having a predetermined stiffness, with said second fibers remaining substantially wholly unmelted during heating.

15. A method according to claim 14 including applying a foamed or foamable composition to the substrate and curing the foamed or foamable composition.

16. A method according to claim 15 including curing the foamed or foamable composition simultaneously with fusing said first fibers during heating.

17. A method of forming a stiff fabric composite including the steps of:

passing a fabric formed of acetate and rayon yarns, a substrate having thermoplastic fibers and a spunbonded polyester through a heat transfer/warp print machine;

heating the fabric to a temperature sufficient to melt certain of the fibers in said substrate for fusing with unmelted fibers in the substrate to provide a composite having a predetermined stiffness with certain fibers remaining substantially wholly unmelted during heating.

18. A method of forming a stiff fabric composite comprising the steps of:

needling a non-woven substrate formed of first and second thermoplastic fibers, wherein said first fibers have a melting temperature lower than the melting temperature of said second fibers, and a woven material one to the other; and heating the needled non-woven fabric and woven fabric to a temperature within a range of 310°–370° F. to melt the first fibers without substantial melting of the second fibers such that the first fibers are fused with the second fibers and to said woven fabric to provide a fabric composite of predetermined stiffness, the step of heating including passing the needled non-woven fabric and woven fabric through an oven at a speed of about 20–30 yards per minute.

19. A method of forming a stiff fabric composite including the steps of:

applying a ground polyester powder to a surface of a non-fusible substrate;

heating the substrate with ground polyester powder applied such that said ground polyester powder obtains a molten state on said substrate;

disposing a fabric on the molten polyester; and laminating the fabric, polyester and substrate to one another to form the stiff fabric composite.

20. A method according to claim 14 wherein the step of heating includes heating the polyester powder to a temperature within a range of 220°–375° F. and the step of laminating includes passing the fabric, polyester and substrate through the nip of a pair of rolls to press the fabric, polyester and substrate together to achieve a bond between the fabric and substrate.

* * * * *